United States Patent
Yoshida et al.

(10) Patent No.: US 9,426,099 B2
(45) Date of Patent: Aug. 23, 2016

(54) ROUTER, METHOD FOR CONTROLLING ROUTER, AND PROGRAM

(71) Applicant: Panasonic Corporation, Osaka (JP)

(72) Inventors: Atsushi Yoshida, Osaka (JP); Takao Yamaguchi, Osaka (JP); Tomoki Ishii, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 841 days.

(21) Appl. No.: 13/628,142

(22) Filed: Sep. 27, 2012

(65) Prior Publication Data

US 2013/0028083 A1   Jan. 31, 2013

Related U.S. Application Data

(63) Continuation of application No. PCT/JP2012/000574, filed on Jan. 30, 2012.

(30) Foreign Application Priority Data

Mar. 9, 2011   (JP) ................................ 2011-052077

(51) Int. Cl.
*H04L 12/28* (2006.01)
*H04L 12/931* (2013.01)
*H04L 12/773* (2013.01)

(52) U.S. Cl.
CPC ................ *H04L 49/60* (2013.01); *H04L 45/60* (2013.01)

(58) Field of Classification Search
CPC ......... H04L 45/02; H04L 45/04; H04L 45/10; H04L 12/56; H04L 2012/56; H04L 47/10; H04L 47/35; H04L 47/30; H04L 47/32; H04W 80/04; H04W 8/26; H04Q 11/06
USPC ......... 370/400, 349, 389, 232, 235, 371, 374, 370/378, 381
See application file for complete search history.

(56) References Cited

U.S. PATENT DOCUMENTS

| | | | |
|---|---|---|---|
| 6,674,720 B1 | 1/2004 | Passint et al. | |
| 7,372,814 B1 * | 5/2008 | Chiruvolu et al. | 370/235 |
| 7,826,460 B2 | 11/2010 | Lee | |

(Continued)

FOREIGN PATENT DOCUMENTS

| | | |
|---|---|---|
| JP | 04-168835 A | 6/1992 |
| JP | 05-235988 A | 9/1993 |

(Continued)

OTHER PUBLICATIONS

International Search Report for corresponding International Application No. PCT/JP2012/000574 mailed Feb. 21, 2012.

*Primary Examiner* — Brenda H Pham
(74) *Attorney, Agent, or Firm* — Renner, Otto, Boisselle & Sklar, LLP

(57) ABSTRACT

An router includes: a plurality of data storage sections configured to store input data; and an arbiter configured to compare the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data.

16 Claims, 38 Drawing Sheets

(56) References Cited

U.S. PATENT DOCUMENTS

| | | |
|---|---|---|
| 2007/0115995 A1 | 5/2007 | Kim et al. |
| 2008/0084893 A1 | 4/2008 | Lee |
| 2009/0252171 A1* | 10/2009 | Kumar et al. ............... 370/397 |
| 2010/0046534 A1 | 2/2010 | Kurosaki et al. |
| 2010/0165846 A1* | 7/2010 | Yamaguchi et al. .......... 370/236 |

FOREIGN PATENT DOCUMENTS

| | | |
|---|---|---|
| JP | 2004-078713 A | 3/2004 |
| JP | 2008-294586 A | 12/2008 |
| JP | 2010-050903 A | 3/2010 |
| JP | 2007-115252 A | 5/2010 |

* cited by examiner

FIG.6

| INPUT PORT NUMBER | VIRTUAL CHANNEL NUMBER | DESTINATION ADDRESS | OUTPUT PORT NUMBER | OUTPUT CHANNEL NUMBER |
|---|---|---|---|---|
| 0 | 0 | NOT USED | TBD | TBD |
| 0 | 1 | 0010 | 1 | TBD |
| 0 | 2 | 0101 | 0 | 0 |
| 0 | 3 | NOT USED | TBD | TBD |
| 1 | 0 | 0001 | 0 | 1 |
| 1 | 1 | 0011 | 1 | TBD |
| 1 | 2 | 0011 | 1 | 2 |
| 1 | 3 | NOT USED | TBD | TBD |

| CONNECTION PORT NUMBER | DESTINATION ADDRESS | NUMBER OF CHANNELS USED |
|---|---|---|
| INPUT PORT 0 | 0011 | 1 |
|  | ... | ... |

| CONNECTION PORT NUMBER | DESTINATION ADDRESS | NUMBER OF CHANNELS USED |
|---|---|---|
| INPUT PORT 1 | 1010 | 1 |
|  | ... | ... |

| CONNECTION PORT NUMBER | DESTINATION ADDRESS | NUMBER OF CHANNELS USED |
|---|---|---|
| OUTPUT PORT 0 | 0010 | 1 |
|  | ... | ... |

| CONNECTION PORT NUMBER | DESTINATION ADDRESS | NUMBER OF CHANNELS USED |
|---|---|---|
| OUTPUT PORT 1 | 1010 | 1 |
|  | ... | ... |

| INPUT PORT NUMBER | VIRTUAL CHANNEL NUMBER | DESTINATION ADDRESS | OUTPUT PORT NUMBER | OUTPUT CHANNEL NUMBER |
|---|---|---|---|---|
| 0 | 0 | — | TBD | TBD |
| | 1 | — | TBD | TBD |
| | 2 | — | TBD | TBD |
| | 3 | — | TBD | TBD |

901

| INPUT PORT NUMBER | VIRTUAL CHANNEL NUMBER | DESTINATION ADDRESS | OUTPUT PORT NUMBER | OUTPUT CHANNEL NUMBER |
|---|---|---|---|---|
| 0 | 0 | 000 | 0 | TBD |
|  | 1 | — | TBD | TBD |
|  | 2 | — | TBD | TBD |
|  | 3 | — | TBD | TBD |

901

| INPUT PORT NUMBER | VIRTUAL CHANNEL NUMBER | DESTINATION ADDRESS | OUTPUT PORT NUMBER | OUTPUT CHANNEL NUMBER |
|---|---|---|---|---|
| 0 | 0 | 000 | 0 | 0 |
|  | 1 | — | TBD | TBD |
|  | 2 | — | TBD | TBD |
|  | 3 | — | TBD | TBD |

901

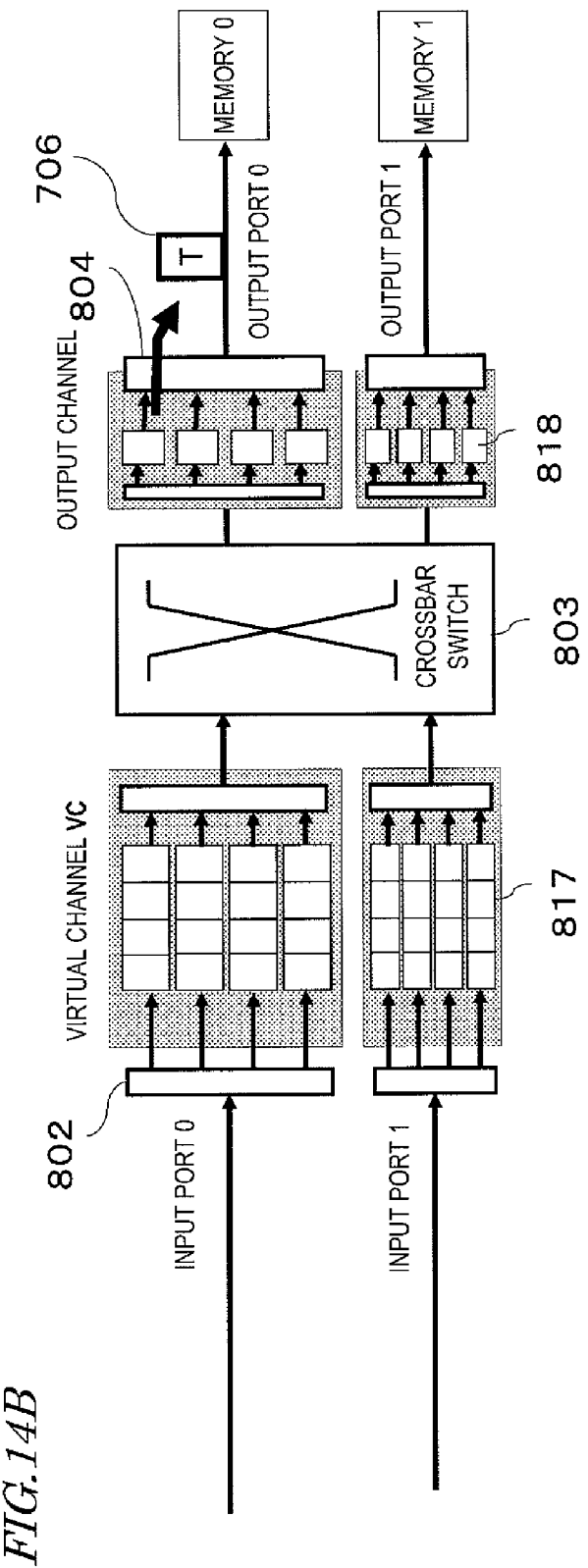

FIG.17

| TYPE OF TRAFFIC FLOW | NUMBER OF VIRTUAL CHANNELS USED | | | DIFFERENCE IN NUMBER OF VIRTUAL CHANNELS USED FROM ROUTER ON RECEIVING END | |
|---|---|---|---|---|---|
| | R0 | R4 | R8 | $\Delta R0$ $(= R0 - R4)$ | $\Delta R4$ $(= R4 - R8)$ |
| TRAFFIC FLOW T0 ADDRESSED TO MEMORY M0 | 1 | 2 | 1 | −1 | 1 |
| TRAFFIC FLOW T1 ADDRESSED TO MEMORY M1 | 1 | 1 | 1 | 0 | 0 |
| TBD | 2 | 1 | 2 | | |

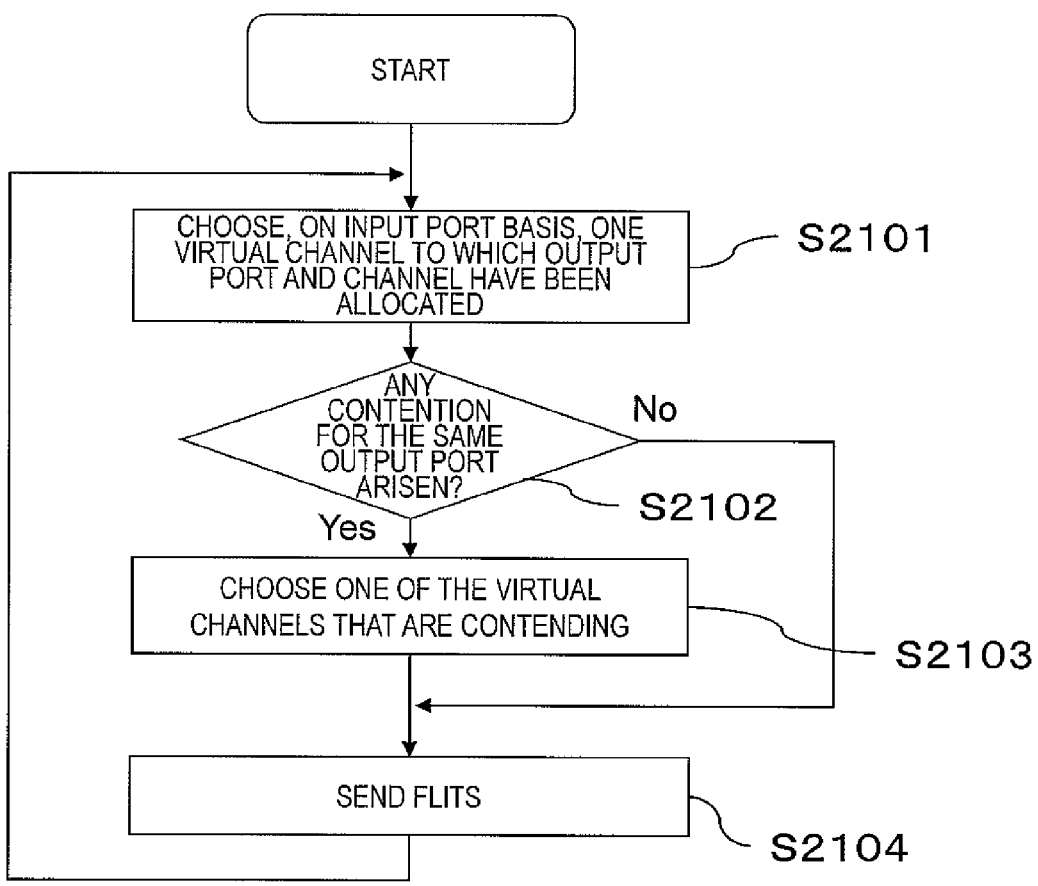

FIG.20

| TYPE OF TRAFFIC FLOW | NUMBER OF VIRTUAL CHANNELS USED | | | DIFFERENCE IN NUMBER OF VIRTUAL CHANNELS USED FROM ROUTER ON RECEIVING END | |
|---|---|---|---|---|---|
| | R0 | R4 | R8 | ΔR0 (= R0 − R4) | ΔR4 (= R4 − R8) |
| TRAFFIC FLOW T0 ADDRESSED TO MEMORY M0 | 2 | 1 | 1 | 1 | 0 |
| TRAFFIC FLOW T1 ADDRESSED TO MEMORY M1 | 1 | 0 | 0 | 1 | 0 |
| TBD | 2 | 3 | 3 | | |

FIG.24

| INPUT PORT NUMBER | VIRTUAL CHANNEL NUMBER | DESTINATION ADDRESS | OUTPUT PORT NUMBER | OUTPUT CHANNEL NUMBER | TIME INFORMATION (MAXIMUM TIME ALLOWED) |
|---|---|---|---|---|---|
| 0 | 0 | NOT USED | TBD | TBD | NOT USED |
| | 1 | 0010 | 1 | TBD | 0...020 |
| | 2 | 0101 | 0 | 0 | 0...005 |
| | 3 | NOT USED | TBD | TBD | NOT USED |
| 1 | 0 | 0001 | 0 | 1 | 0...025 |
| | 1 | 0011 | 1 | TBD | 0...011 |
| | 2 | 0011 | 1 | 2 | 0...018 |
| | 3 | NOT USED | TBD | TBD | NOT USED |

2701

| INPUT PORT NUMBER | VIRTUAL CHANNEL NUMBER | DESTINATION | OUTPUT PORT NUMBER | OUTPUT CHANNEL NUMBER | TIME INFORMATION (MAXIMUM TIME ALLOWED) |
|---|---|---|---|---|---|
| — | 0 | MEMORY M0 | 0 | 0 | 100 |
| | 1 | MEMORY M0 | 0 | TBD | 200 |
| | 2 | MEMORY M0 | 0 | TBD | 150 |
| | 3 | MEMORY M0 | 0 | TBD | 210 |

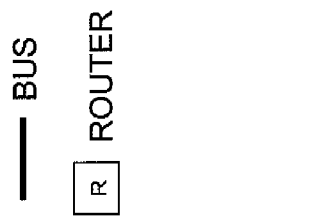
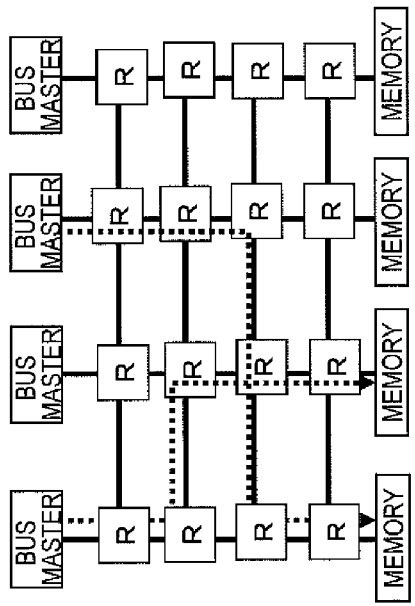
FIG.35B
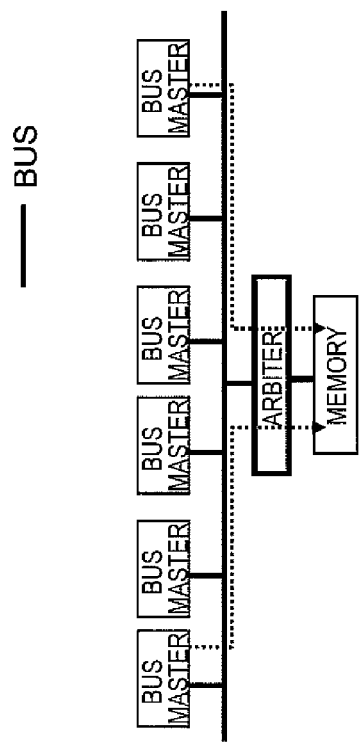
FIG.35A

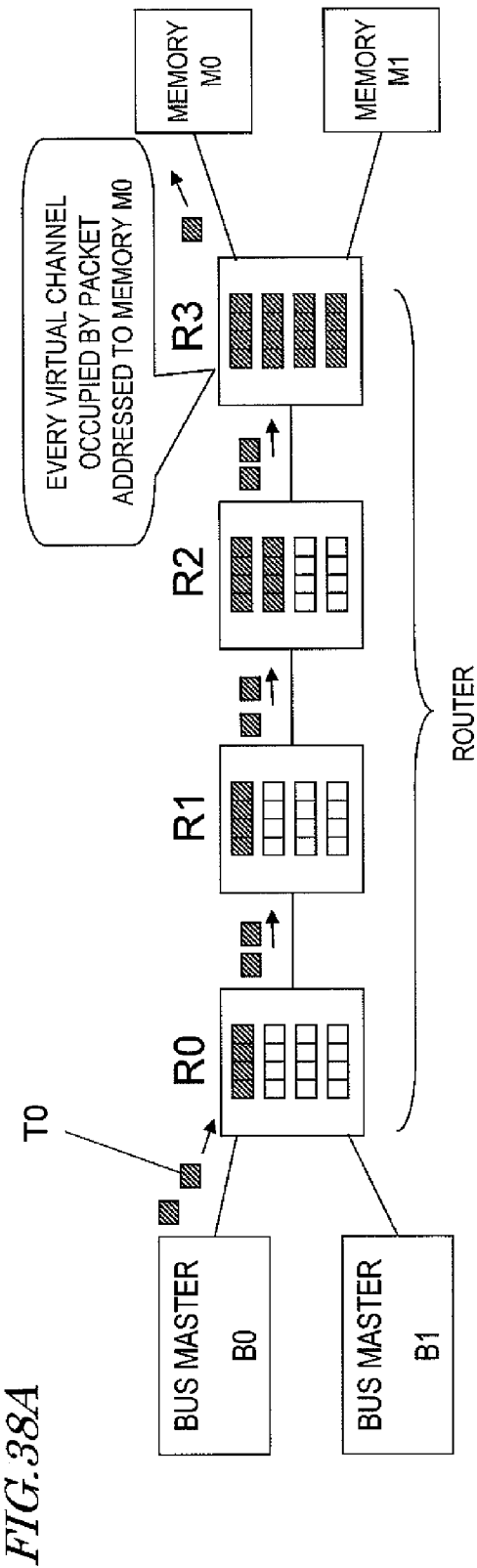
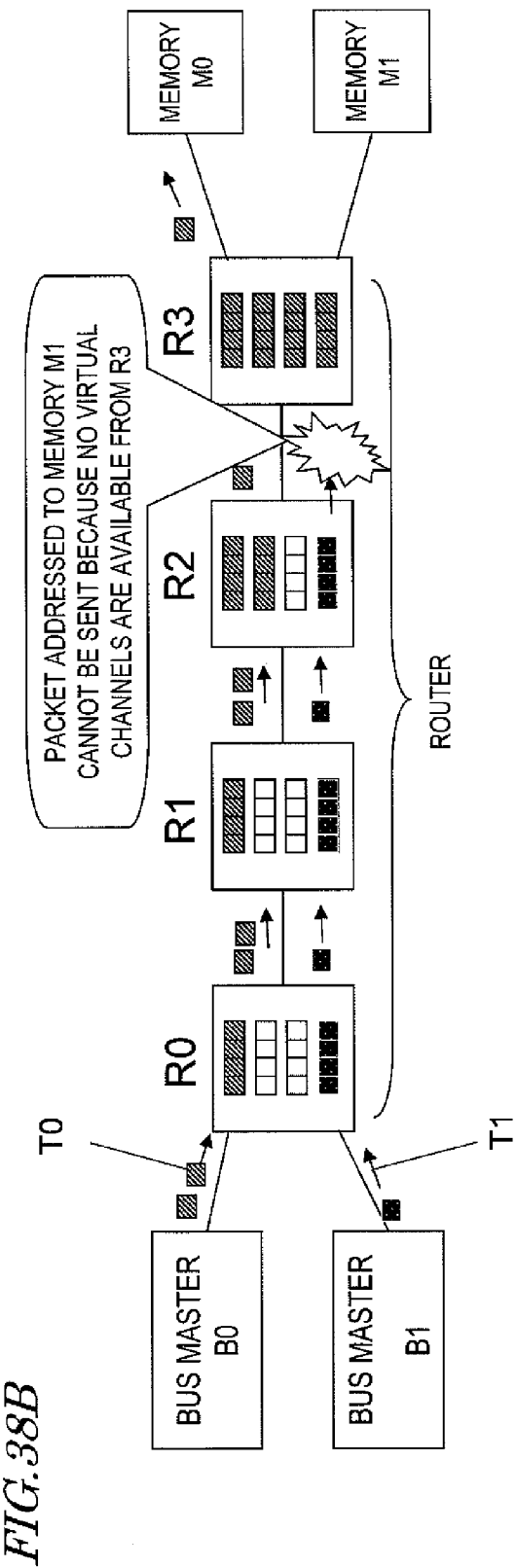
FIG.38A
FIG.38B

ROUTER, METHOD FOR CONTROLLING ROUTER, AND PROGRAM

This is a continuation of International Application No. PCT/JP2012/000574, with an international filing date of Jan. 30, 2012, which claims priority of Japanese Patent Application No. 2011-052077, filed on Mar. 9, 2011, the contents of which are hereby incorporated by reference.

BACKGROUND

1. Technical Field

The present disclosure relates to a technology for arranging a transmission schedule for a traffic flow that runs through a plurality of routers connected together through a distributed bus, in a semiconductor integrated circuit including such a bus.

2. Description of the Related Art

There are various methods for controlling the transfer of data through a semiconductor integrated circuit including a bus. FIGS. 35A and 35B illustrate exemplary known transfer control methods for a semiconductor integrated circuit. FIG. 35A illustrates an example of a centralized bus control. In a known integrated circuit that performs such a centralized bus control, a number of bus masters and a memory are usually connected together with a single bus, and accesses to the memory by the respective bus masters are arbitrated by an arbiter. By adopting such a configuration, data can be transferred while avoiding traffic flow interference between the bus masters and the memory. However, as the functionality of an integrated circuit has been further improved and as the number of cores in an integrated circuit has been further increased these days, the scale of the circuit has become even larger and the traffic flow through the transmission path has gotten even more complicated. As a result, it has become increasingly difficult to design an integrated circuit by such a centralized bus control.

Meanwhile, semiconductor integrated circuits with distributed buses have been developed one after another lately by introducing connection technologies in parallel computers and/or network control technologies. FIG. 35B illustrates an example of such a distributed bus control. In a semiconductor integrated circuit with distributed buses, a number of routers R are connected together with multiple buses. Recently, people have been working on a so-called "Network on Chip (NoC)" in which traffic flows in a large-scale integrated circuit are transferred through a number of distributed buses by adopting the distributed bus control such as the one shown in FIG. 35B.

FIG. 36 illustrates an exemplary configuration for a router for use in an NoC, parallel computers, an Asynchronous Transfer Mode (ATM) network, and so on. The data to be transferred (i.e., traffic data) is divided into a number of small units such as packets or cells, each of which is transferred to its destination node by way of multiple routers. The router shown in FIG. 36 includes Input Ports #0 and #1, two buffers #0 and #1 that are associated with these two input ports #0 and #1, respectively, Output Ports #0 and #1, and a crossbar switch that connects together the respective input buffers and the respective output ports. The router shown in FIG. 36 further includes an arbiter which performs a control operation by changing connection of the crossbar switch according to the destination of data. The data that has been input to this router through the Input Ports #0 and #1 is temporarily stored in the buffers #0 and #1. Each of these buffers #0 and #1 includes a plurality of virtual channels (VCs), which are connected in parallel with each other, and different sets of data can be processed in parallel on an input port basis.

The crossbar switch is a switch for determining an exclusive connection between each input port and its associated output port. In this description, the "exclusive connection" refers to a situation where not more than one input port is connected to one output port.

The exclusive connection between an input port and its associated output port via the crossbar switch is also arbitrated by an arbiter. By getting the crossbar switch turned by the arbiter in this manner, the router transfers the data that is stored in the buffers to a destination.

FIG. 37 illustrates an exemplary flow of packets that are transmitted from bus masters to memories via multiple routers. In the example illustrated in FIG. 37, two bus masters B0 and B1 are connected to two memories M0 and M1 via multiple routers R0, R1, R2 and R3 that are connected together in series. Each of these routers R0, R1, R2 and R3 has four virtual channels. In this example, traffic flows T0 and T1 are supposed to be transmitted from the bus master B0 to the memory M0 and from the bus master B1 to the memory M1, respectively, in the same mixture.

In FIG. 37, illustration of virtual channels that are provided for each input port is omitted for the sake of simplicity. Even though each of these routers can actually be connected to an even larger number of routers, bus masters or memories, only those four routers that are connected together in series are shown in FIG. 37 for the sake of simplicity. Also, in order to distinguish those traffic flows T0 and T1 easily, the virtual channels are supposed to be sequentially allocated to the traffic flows T0 and T1 from top to bottom and from bottom to top, respectively, in each router. It should be noted that the method shown in FIG. 37 is just an exemplary method for allocating virtual channels and there are various other methods for allocating virtual channels on a packet by packet basis.

The bus master B0 sends packets to the memory M0, while the bus master B1 sends packets to the memory M1. Each of those packets sent from each bus master is divided into smaller units called "flits", which can be each transmitted in one cycle. And the packets are transferred to the destination memory on a flit by flit basis. On receiving a flit, a router processes that flit by performing the processing steps of: (1) storing the flit on a virtual channel specified, (2) determining to what router the flit needs to be transferred next, (3) determining on which virtual channel the flit will need to be stored in the next router, and then (4) sending the flit to the next router. By getting theses four processing steps done by each router, flits are sent to their destination one after another. And when all of those flits are delivered to their destination, they will be combined together to form the original single packet again.

In the example illustrated in FIG. 37, the router R0 adjacent to the bus masters B0 and B1 (1) stores the flits received from those bus masters in the virtual channels that were specified by the bus masters when the flits were sent. In this case, if the given flits form part of different packets, then those flits are stored on different virtual channels. Next, the router R0 (2) determines, by reference to the address information attached to the flit stored and on a virtual channel basis, to what router each of those flits needs to be transferred next. In the example illustrated in FIG. 37, the router R1 is supposed to be chosen as the destination of the flits transferred for each of the virtual channels. Subsequently, the router R0 (3) determines, on a virtual channel basis, on which virtual channel the flit will need to be stored in the next router R1. And once the next router R1 and the virtual channel to store the data in the next router R1 are determined on a virtual channel basis, the router R0 (4) sends the flits to that router R1.

Likewise, each of the other routers R1, R2 and R3 also (1) stores the flit that has been received from the previous router on the virtual channel specified, (2) determines to what router the flit needs to be transferred next, (3) determines on which virtual channel the flit will need to be stored in the next router, and then (4) transfers the flit to the next router or the destination memory. In this manner, data is transferred from multiple bus masters to multiple destination memories.

In a transfer system that uses the known router shown in FIG. 37, if there is a heavy transfer load, then competition may sometimes arise between flits to be delivered to different destinations when each router performs the processing steps (3) and (4). And once the competition arises, the packets may be delivered to the destination in a different order from the one in which they were sent. Or the time delay may be significantly different from one traffic flow to another. As a result, a decline will be caused in the quality of transfer.

That is why it is necessary to maintain the order in which packets have been sent and to minimize an increase in time delay or jitter for each traffic flow. For that purpose, a so-called "age-based" method has been proposed in U.S. Pat. No. 6,674,720, for example. According to that method, an estimated value called "age" is defined based on the time when a packet was transmitted and the number of hops that the packet has made (i.e., the number of routers that the packet has passed through). And according to the "age-based" method, a packet with the maximum (or minimum) age is supposed to be sent first.

SUMMARY

In a transfer system that uses the known routers, a particular traffic flow may occupy the virtual channels of some router, thus causing a delay in the transfer of other traffic flows.

One non-limiting, and exemplary embodiment provides a technique to overcome such a problem with the known routers by preventing a traffic flow to be delivered to a particular destination from occupying the input buffer of a router without increasing the size or number of data storage sections in the input buffer.

In one general aspect, a router disclosed herein is designed to be used in a data transfer system that includes a first node from which data is transmitted, a second node at which the data that has been transmitted from the first node is received, and a plurality of routers that relay the data to be transferred between the first and second nodes through a bus. The router includes: a plurality of data storage sections configured to store input data; and an arbiter configured to compare the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data.

According to the above aspect, it is possible to prevent a traffic flow with a particular destination from occupying data storage sections in an input buffer in a router without increasing the size or the number of those data storage sections. As a result, the overall transfer performance (including the throughput and time delay) of an NoC can be improved without significantly increasing the implementation area or power dissipation of an integrated circuit.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 3 shows what components each of the routers shown on the drawings is comprised of.

FIG. 4 shows what fields a packet may be made up of.

FIG. 6 shows the contents of virtual channel information.

FIG. 7 shows the contents of adjacent channel availability information.

FIGS. 14A and 14B show how the router of the first embodiment operates.

FIG. 17 shows how virtual channels may be used in the router of the first embodiment.

FIG. 18 is a flowchart showing a procedure in which the router of the first embodiment sends flits.

FIG. 20 shows how virtual channels may be used in the router of the second embodiment.

FIG. 24 shows the contents of virtual channel information according to the third embodiment.

FIGS. 35A and 35B illustrate a few kinds of known semiconductor systems that use a bus.

FIGS. 38A and 38B point out what is a problem with the related art.

DETAILED DESCRIPTION

Before specific embodiments of the present disclosure are described, first of all, the problem of the conventional router will be described.

Figure 37:
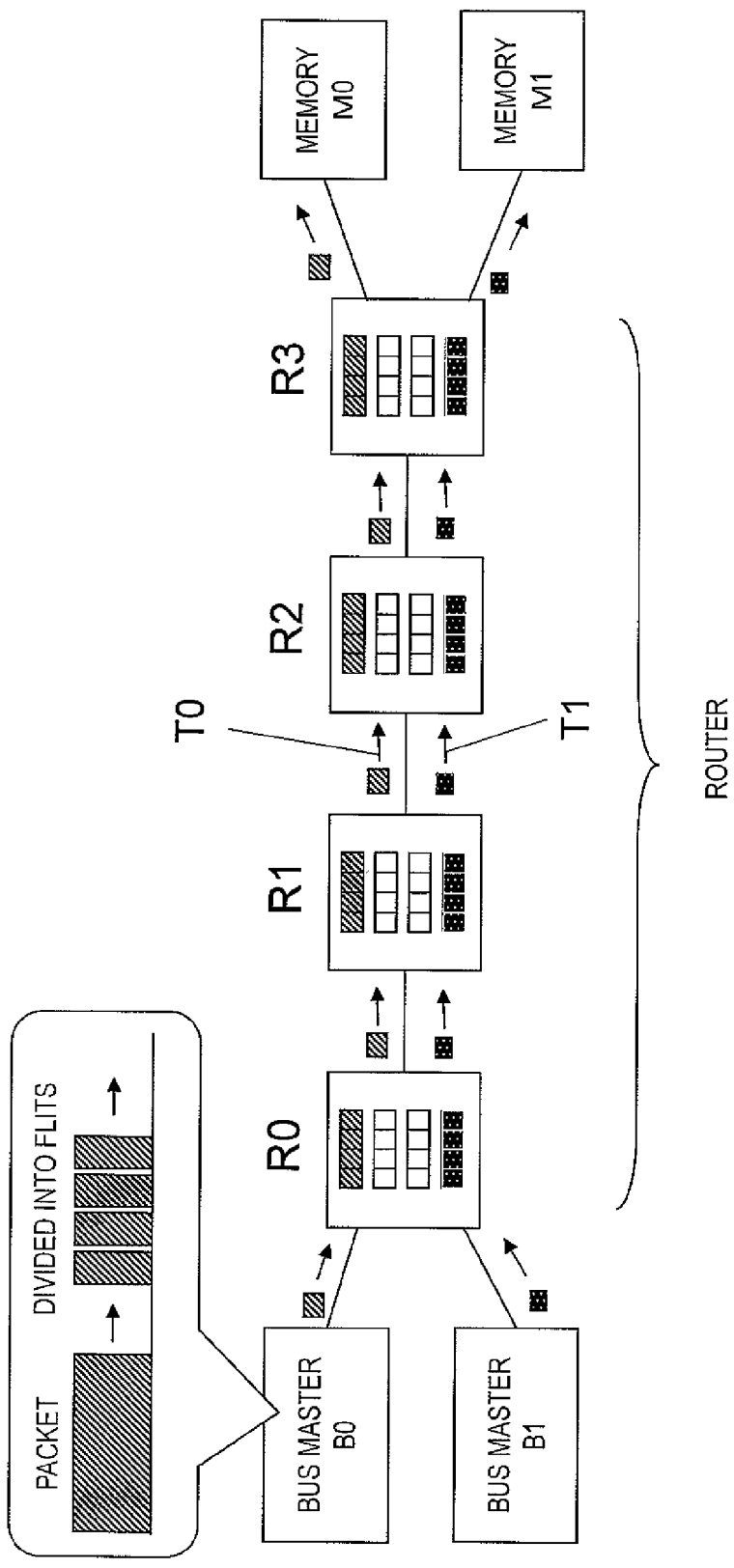
FIG. 37 illustrates how a known router may operate.

FIGS. 38A and 38B illustrate what is a problem with a semiconductor system that uses known routers having the same configuration as the one shown in FIG. 37. In a known semiconductor system, if there is any variation in the processing carried out by the bus masters or memories, the traffic flow transfer rate could vary or the numbers of virtual channels used could become uneven between routers on the transmission path of a traffic flow. For example, suppose a situation where the traffic flow to be transmitted from the bus master B0 to the memory M0 has a relatively high transfer rate and the traffic flow to be transmitted from the bus master B1 to the memory M1 either has a relatively low transfer rate or is not moving at all. In that case, if there are any virtual channels available from the next router, then each router will send packets to that next router unconditionally. As a result, some router R3 that is located closer to the memory may have every virtual channel thereof occupied with the packets that have been received from the bus master B0 as shown in FIG. 38A. In that case, the numbers of virtual channels used become very uneven between the routers on the traffic flow transmission path.

If in such a situation where every virtual channel of the router R3 on the transmission path is occupied by the traffic flow T0 directed toward the memory M0, packets are sent from another bus master B1 to another memory M1, then competition arises between the traffic flows. In that case, since every virtual channel of the router R3 is occupied, those packets headed to the memory M1 cannot be delivered to the memory M1 until some virtual channels are available from the router R3 as shown in FIG. 38B.

Generally speaking, a different amount of permissible delay is set for a media processing type traffic flow according to the type of the given application. For example, suppose a relatively long permissible time delay has been set for the traffic flow T0 and a relatively short permissible time delay has been set for the traffic flow T1 in FIGS. 38A and 38B. In that case, even if the packets have been delivered successfully to the destination within a specified amount of time with respect to the traffic flow T0, every virtual buffer of the router R3 on the transmission path is occupied for a long time. As a result, a longer delay than that of the traffic flow T0 will be caused in the traffic flow T1 that has a shorter permissible time delay, and the packets cannot be transferred within the permissible time delay of the traffic flow T1, which is a problem.

To avoid such an unwanted situation where every virtual channel of some router on the transmission path is occupied by a particular traffic flow, the capacity of the virtual channels could be increased. Nevertheless, unlike ordinary routers for use in parallel computers and ATM, it is difficult to provide a lot of virtual channels for such a router to be implemented on an integrated circuit due to constraints on the given chip area and cost.

On top of that, since only a relatively short time is afforded to an integrated circuit with respect to the propagation delay of packets, it is far from being favorable to wait until the virtual channels occupied by the particular traffic flow are freed.

As can be seen, as for a router implemented on an integrated circuit, it is not effective enough to apply the routing flow rate control method such as the age-based method, which can be used in general parallel computers, ATM and so on, as it is. It is important to prevent a traffic flow to be delivered to a particular destination from occupying the input buffer of a router on the transmission path.

The present disclosure provides a technique to overcome such problems by preventing a traffic flow to be delivered to a particular destination from occupying the input buffer of a router without increasing the size or number of data storage sections in the input buffer.

Hereinafter, the outline of exemplary embodiments of the present disclosure will be described.

In one aspect of the present disclosure, a router is designed to be used in a data transfer system that includes a first node from which data is transmitted, a second node at which the data that has been transmitted from the first node is received, and a plurality of routers that relay the data to be transferred between the first and second nodes through a bus. The router includes: a plurality of data storage sections configured to store input data; and an arbiter configured to compare the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data.

In one embodiment, the destination of that data is the adjacent router.

In one embodiment, the arbiter is configured to compare the availability of the data storage section of its own router with respect to data that has the same destination address and/or the same source address to the availability of the data storage section in the adjacent router, thereby determining, based on a result of the comparison, whether or not to output that data.

In one embodiment, the arbiter is configured to compare the number of data storage sections that store the data that shares at least a part of the transmission path to the number of data storage sections that store the data that shares at least that part of the transmission path in the adjacent router, thereby determining, based on a result of the comparison, whether or not to output that data.

In one embodiment, if the difference obtained by subtracting the number of data storage sections that store the data that shares at least that part of the transmission path in the adjacent router from the number of data storage sections that store the data that shares at least a part of the transmission path is equal to or greater than a preset threshold value, the arbiter outputs the data, but if the difference is less than the threshold value, the arbiter does not output the data.

In one embodiment, the threshold value is zero.

In one embodiment, if multiple groups of data, which share at least a part of the transmission path represented by the data of each said group, are stored in the plurality of data storage sections, the arbiter obtains a difference by subtracting the number of the data storage sections used in the next adjacent router from the number of the data storage sections used in its own router, finds what groups have differences that are equal to or greater than the threshold value, and outputs the data of at least one of the groups that has the maximum difference.

In one embodiment, if there are multiple data that have the maximum difference, the arbiter outputs the data of the smallest number of the data storage sections that are used in the next adjacent router.

In one embodiment, the data entered into the plurality of data storage sections include time information indicating one of a time when the data was transmitted, the amount of time that has passed since the data was transmitted, a time when the data is expected to arrive at the second node, and the time left until the time when the data is expected to arrive at the second node, and the arbiter determines the data to output based on the value of the time information.

In one embodiment, if multiple data indicate that the smallest number of data storage sections will be used in the next adjacent router, the arbiter determines the data to output based on the value of the time information.

In one embodiment, each of the plurality of data storage sections is a virtual channel that is comprised of virtual lines.

In one embodiment, the arbiter further includes a channel availability information communications section which sends information indicating the number of data storage sections that store the data that shares at least a part of the transmission path to at least one of the adjacent router and another adjacent router and which gets the information indicating the number of data storage sections that store the data that shares at least that part of the transmission path from the former adjacent router.

In one embodiment, its own router is arranged adjacent to the first node, and the arbiter further includes a flow controlling and regulating section which instructs the first node to control the rate of data to transfer if the number of data storage sections that store the data that shares at least a part of the transmission path is larger than a predetermined threshold value.

In another aspect of the present disclosure, a method is used for controlling a router for use in a data transfer system that includes a first node from which data is transmitted, a second node at which the data that has been transmitted from the first node is received, and a plurality of routers that relay the data to be transferred between the first and second nodes through a bus. The method comprises the steps of: storing input data in a plurality of data storage sections; and comparing the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data.

In another aspect of the present disclosure, a control program stored on a non-transitory computer-readable medium is to be executed by a computer mounted in a router for use in a data transfer system that includes a first node from which data is transmitted, a second node at which the data that has been transmitted from the first node is received, and a plurality of routers that relay the data to be transferred between the first and second nodes through a bus. The program causes the computer in the router to execute the steps of: storing input data in a plurality of data storage sections; and comparing the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data.

In another aspect of the present disclosure, a simulation program stored on a non-transitory computer-readable medium is to be executed by a computer, the program being dedicated to design a router for use in a data transfer system that includes a first node from which data is transmitted, a second node at which the data that has been transmitted from the first node is received, and a plurality of routers that relay the data to be transferred between the first and second nodes through a bus. The program causes the computer to execute the steps of: storing input data in a plurality of data storage sections; and comparing the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data.

Before details of specific embodiments of the present disclosure are described, first of all, the principle of operation of a router according to the present disclosure will be described.

A router according to the present disclosure includes a plurality of data storage sections which store input data, and an arbiter which arbitrates transmission of the data that is stored in those data storage sections. The data that has been entered into the router is once stored in any of those data storage sections. The arbiter compares the availability of at least one of the plurality of data storage sections with respect to data that is stored in that data storage section and that shares at least a part of a transmission path to the availability of another data storage section in adjacent router with respect to that data, thereby determining, based on a result of the comparison, whether or not to output that data. In this description, the "data that shares at least a part of a transmission path" refers herein to a set of data that passes through the same point on the transmission path. Examples of such data include a group of data that should arrive at the same destination, a group of data that has been transmitted from the same source, a group of data that goes through another router in common, and a group of data to be transferred through the same input or output port of its own router.

For example, if an address attribute such as the destination address or the source address has been defined for given data, then the arbiter compares, between two adjacent routers, pieces of information indicating the degrees to which data having the same address attribute as the data that is stored in each data storage section uses the data storage section, thereby determining, based on a result of the comparison, whether or not to output that data. For instance, the arbiter collects pieces of information indicating the availabilities of multiple data storage sections on a destination address basis from an adjacent router and allocates the data storage sections based on that information in cooperation with an adjacent router. Hereinafter, it will be described as an example how a router according to the present disclosure may operate.

Figure 1A:
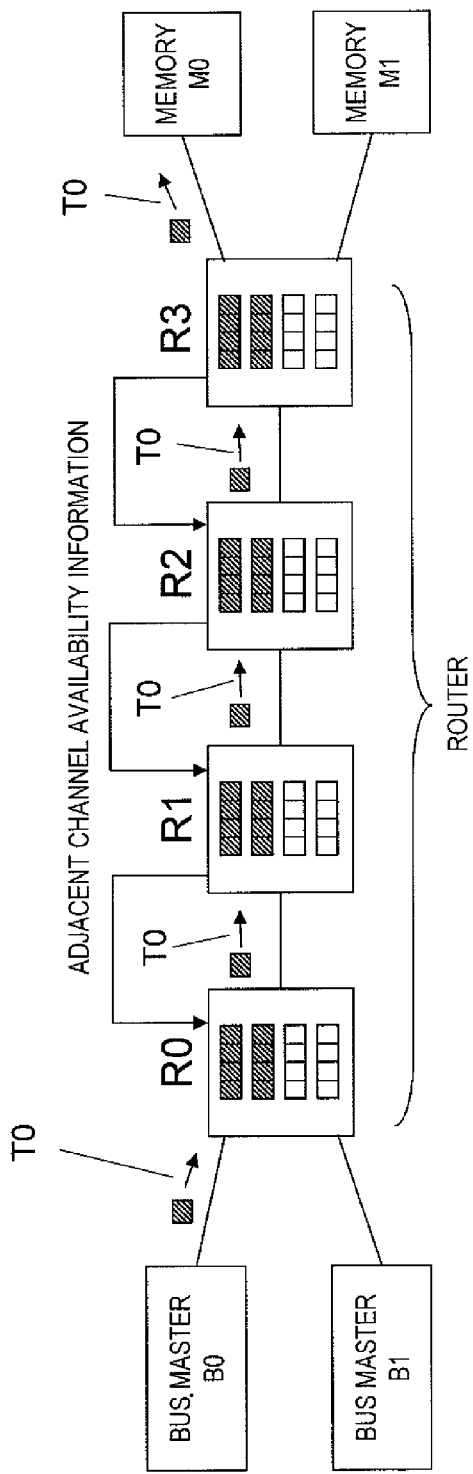
FIGS. 1A and 1B present an approach according to an exemplary embodiment of the present disclosure to the problem.
Figure 1B:
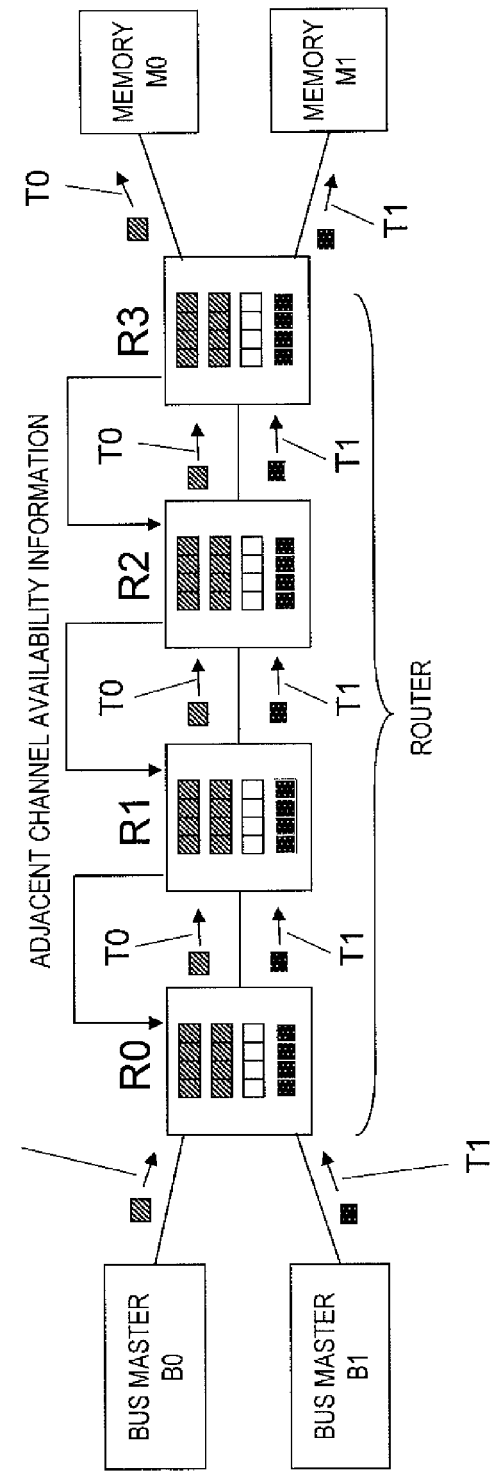

FIGS. 1A and 1B outlines how routers according to the present disclosure operate in a transfer system having the same configuration as what is shown in FIGS. 38A and 38B. In the example illustrated in FIGS. 1A and 1B, each of the virtual channels in each router functions as a data storage section. Each of the routers R0, R1, R2 and R3 on the transmission path obtains information indicating how many virtual channels need to be used by a packet included in a traffic flow T0 in an adjacent router at the receiving end (which will be referred to herein as "adjacent channel availability information") while the traffic flow T0 is being transferred from a bus master B0 toward a memory M0. And if the difference obtained by calculating the number of virtual channels to be used in the adjacent router at the receiving end from the number of virtual channels in its own router is equal to or greater than a preset threshold value (which may be set to be zero) with respect to the traffic flow T0, each router newly secures another virtual channel from the next router and sends the packet to the next router. On the other hand, if the difference is less than the preset threshold value, each router does not secure any additional virtual channel. As a result, it is possible to avoid securing virtual channels unnecessarily. Optionally, it may also be determined, based on the ratio of the number of virtual channels to be used in the next adjacent router to that number of virtual channels to be used in its own router, instead of their difference, whether or not to send the packet.

Suppose a situation where in each of the routers R0, R1, R2 and R3, the traffic flow T0 uses two virtual channels as shown in FIG. 1A. In this case, if a request to transfer a traffic flow T1 from a bus master B1 to a memory M1 has been generated as shown in FIG. 1B, each router can secure virtual channels for the traffic flow T1 because there are some virtual channels available from each router on the transmission path. As a result, the bus master B1 can transfer the traffic flow T1 to the memory M1 right away.

As can be seen, according to the present disclosure, when a traffic flow is transferred through a number of routers, the numbers of virtual channels to be used by the traffic flow on the transmission path can be much more uniform, thus avoiding shortage of virtual channels at any particular router. As a result, even if there is any sudden request to transfer a traffic flow, the traffic flow can still be transferred right away and the overall transfer performance of the NoC can be improved.

In a router for use in a general-purpose system such as a parallel computer or an ATM, a smaller number of constraints are imposed on the number and size of virtual channels than an NoC, and therefore, attention has never been paid to the problem that virtual channels could run short on the transmission path. Generally speaking, in those systems, emphasis has been put on how to send as many packets as possible from a router itself to the next router or receiving node.

In contrast, in an NoC to which the present disclosure is intended to be applied primarily, it is difficult to increase the number or size of virtual channels. Thus, according to the present disclosure, to make the number of virtual channels to be used by each traffic flow uniform between respective routers, the virtual channels to use are allocated in cooperation with each other between adjacent routers on the transmission path. As a result, it is possible to prevent any particular traffic flow from using too many virtual channels exclusively and the shortage of virtual channels can be minimized.

In FIG. 1B, to distinguish the traffic flows T0 and T1 from each other easily, each of the routers R0, R1, R2 and R3 is supposed to allocate virtual channels sequentially from top to bottom on the paper as for the traffic flow T0 and from bottom to top on the paper as for the traffic flow T1. However, this is only an exemplary method for allocating virtual channels. Rather any method other than the one shown in FIG. 1B may also be adopted as long as virtual channels can be allocated on a packet by packet basis. Also, even though a system for transferring traffic flows from two bus masters to two memories via four routers is illustrated in FIGS. 1A and 1B, the present disclosure does not always have to be applied to such a system.

Furthermore, in the example described above, the bus masters are supposed to be nodes on the transmitting end and the memories are supposed to be nodes on the receiving end. However, this combination is just an example of the present disclosure. For example, when data is going to be read from a memory, memories may be arranged as nodes on the transmitting end and bus masters may be arranged as nodes on the receiving end. Also, the nodes at the other end for a bus master do not have to be memories but may also be an input/output port (I/O) to be connected to an external storage device such as an external HDD. Examples of such input/output ports include a USB port. Speaking more generally, the present disclosure is applicable to any system in which data is transferred from a transmitting node to a receiving node via a number of routers.

In FIGS. 1A and 1B, each router is supposed to obtain adjacent channel availability information from its adjacent router on the receiving end. However, that information may also be obtained from the adjacent router on the transmitting section end. Or that information may even be obtained from both of the two adjacent routers. Furthermore, the virtual channels do not always have to be allocated as described above based on the adjacent channel availability information but may also be allocated by any of various other methods as will be described later.

Hereinafter, more specific embodiments of the present disclosure will be described. In the following description, any pair of components shown in multiple drawings and having substantially the same function will be identified by the same reference numeral.

Embodiment 1

Figure 2:
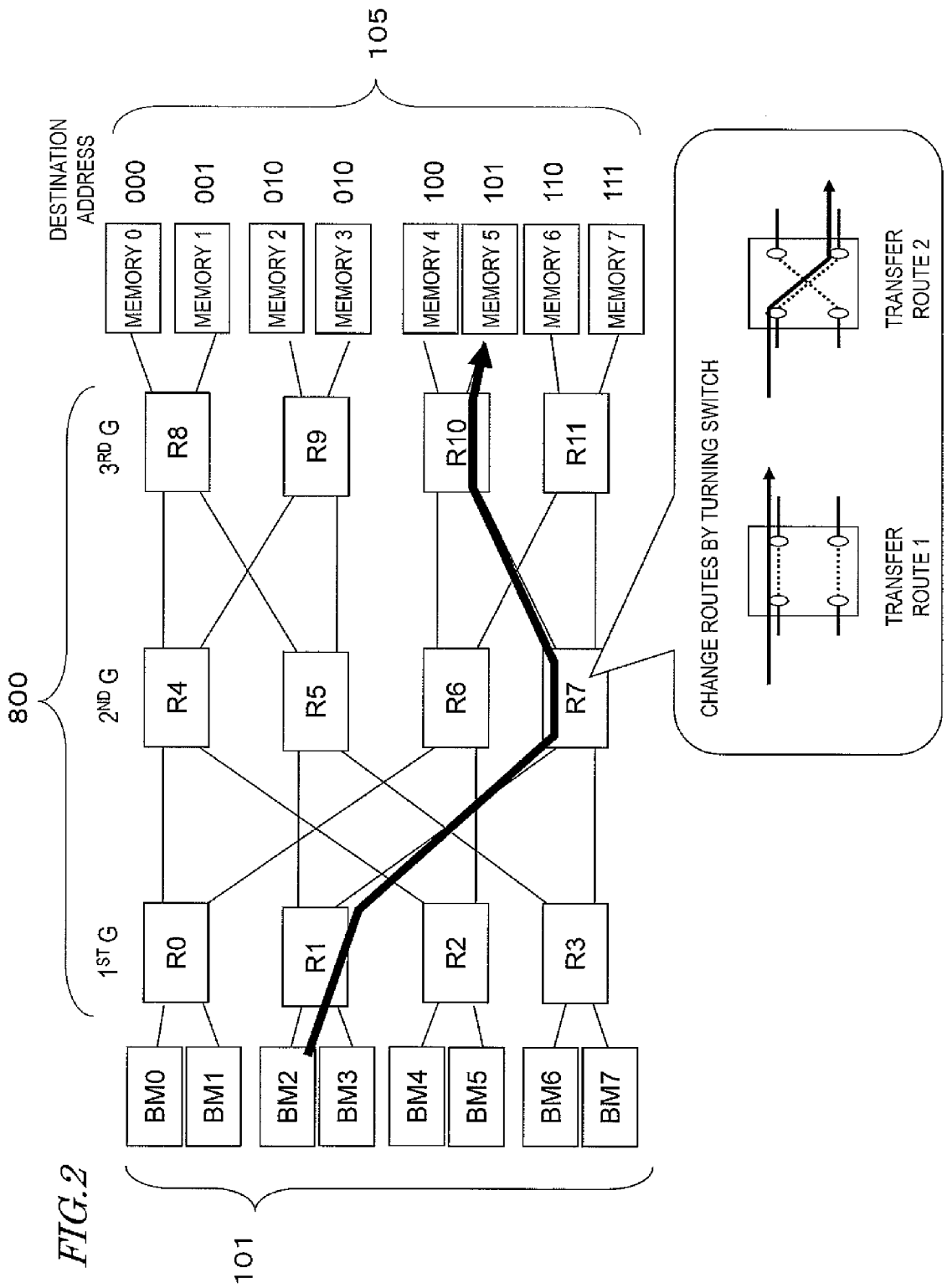
FIG. 2 illustrates an overall configuration for an NoC according to a first embodiment.

FIG. 2 illustrates an exemplary configuration for a distributed data transfer system that uses routers according to a first embodiment of the present disclosure. The system shown in FIG. 2 includes a plurality of bus masters (BMs) 101 as transmitting nodes and a plurality of memories 105 as receiving nodes. Those bus masters 101 and memories 105 are connected together in multiple stages with a bus via a number of routers 800. In this manner, the transfer system shown in FIG. 2 forms a multistage interconnection network (MIN). In this embodiment, those bus masters 101 function as first nodes according to the present disclosure and those memories 105 function as second nodes according to the present disclosure.

In this embodiment, the bus masters 101 are devices that can perform a data transfer control using a bus and may be CPUs (central processing units) or DSPs (digital signal processors), for example. The memories 105 may be semiconductor memories such as DRAMs or SRAMs. The routers 800 may be implemented as semiconductor circuits, for example, and have the function of relaying data to be transferred between those bus masters 101 and memories 105.

In the exemplary configuration shown in FIG. 2, eight bus masters (BM0 through BM7), twelve routers (R0 through R11), and eight memories (Memories #0 through #7) are connected together with a bus. Those twelve routers are classified into the following three groups. The first group ($1^{st}$ G)

consists of four routers (R0, R1, R2 and R3) that are connected to the eight bus masters 101. The second group ($2^{nd}$ G) consists of four routers (R4, R5, R6 and R7) which are connected to behind the first group. And the third group consists of four routers (R8, R9, R10 and R11) which are connected to behind the second group and also connected to the eight memories 105.

Each of those routers that form parts of the multistage interconnection network shown in FIG. 2 includes a crossbar switch with two inputs and two outputs. By changing the input and output combinations with the crossbar switch turned as shown in the balloon portion of FIG. 2, the traffic flow can pass selectively through one of the two transmission paths (Transmission paths #1 and #2). It should be noted that if the destinations cannot be reached unless both of these two transmission paths are taken, then the router may output the two traffic flows through both of the two transmission paths at the same time. In this multistage interconnection network, by turning the crossbar switch at each router, one or more transmission paths can always be formed between every bus master and every memory.

In general, to connect every one of N bus masters and every one of M memories together with crossbar switches, N×M switches are needed. In this description, a "switch" refers herein to something that is arranged at an intersection between a set of communications lines that run parallel with each other in one direction and another set of communications lines that run parallel with each other in another direction and that can form a communications line dynamically by being turned ON and OFF. Generally speaking, the greater the number of bus masters or memories, the more steeply the number of switches needed rises. On the other hand, the multistage interconnection network is characterized by connecting crossbar switches with a small number of inputs and outputs in a hierarchical pattern so that the connection between the bus masters and memories can be changed with a much smaller number of switches.

Data is transferred from a bus master 101 to a memory 105 by the packet exchange method. Each bus master 101 is supposed to divide a packet to send into the smallest units called "flits" and then sends them to an adjacent router. The first one of those flits obtained by dividing one packet, which is sent earlier than any other flit, is called a "header flit", in which described are flag information indicating that this is the head of a packet and the address information of the packet's destination. The data structures of packets and flits according to this embodiment will be described in detail later.

In the configuration shown in FIG. 2, if data is to be transferred from BM2 to Memory #5, then BM2 divides a packet, which specifies the address (101) of Memory #5 as the destination address, into a plurality of flits and sends them to the router R1. Those divided flits are transferred to Memory #5 via the routers R1, R7 and R10. Memory #5 receives those flits from the router R10 and restores the original packet based on those flits. By performing this series of processing steps, data is transferred from BM2 to Memory #5. The data structures of the packets and flits will be described later.

It should be noted that routers according to this embodiment do not have to be applied to an integrated circuit that forms a multistage interconnection network such as the one shown in FIG. 2 but may also be applied to an integrated circuit with any other topology as well. Also, although data is supposed to be transferred in the embodiment described above from a bus master to a memory via multiple routers by the packet exchange method, data may also be transferred by any other method. The router of this embodiment does not always have to be used to transfer data from a bus master to a memory but may also be applied to any other system as long as the system is designed to transfer data between multiple nodes.

In the configuration shown in FIG. 2, the first and third groups of routers (R0 through R3 and R8 through R11), as well as the second group of routers (R4 through R7), are each illustrated as a single functional block. Actually, however, any other functional section such as an NIC (network interface controller) may be connected between each router belonging to the first group and the bus master and between each router belonging to the third group and the memory.

Figure 3:
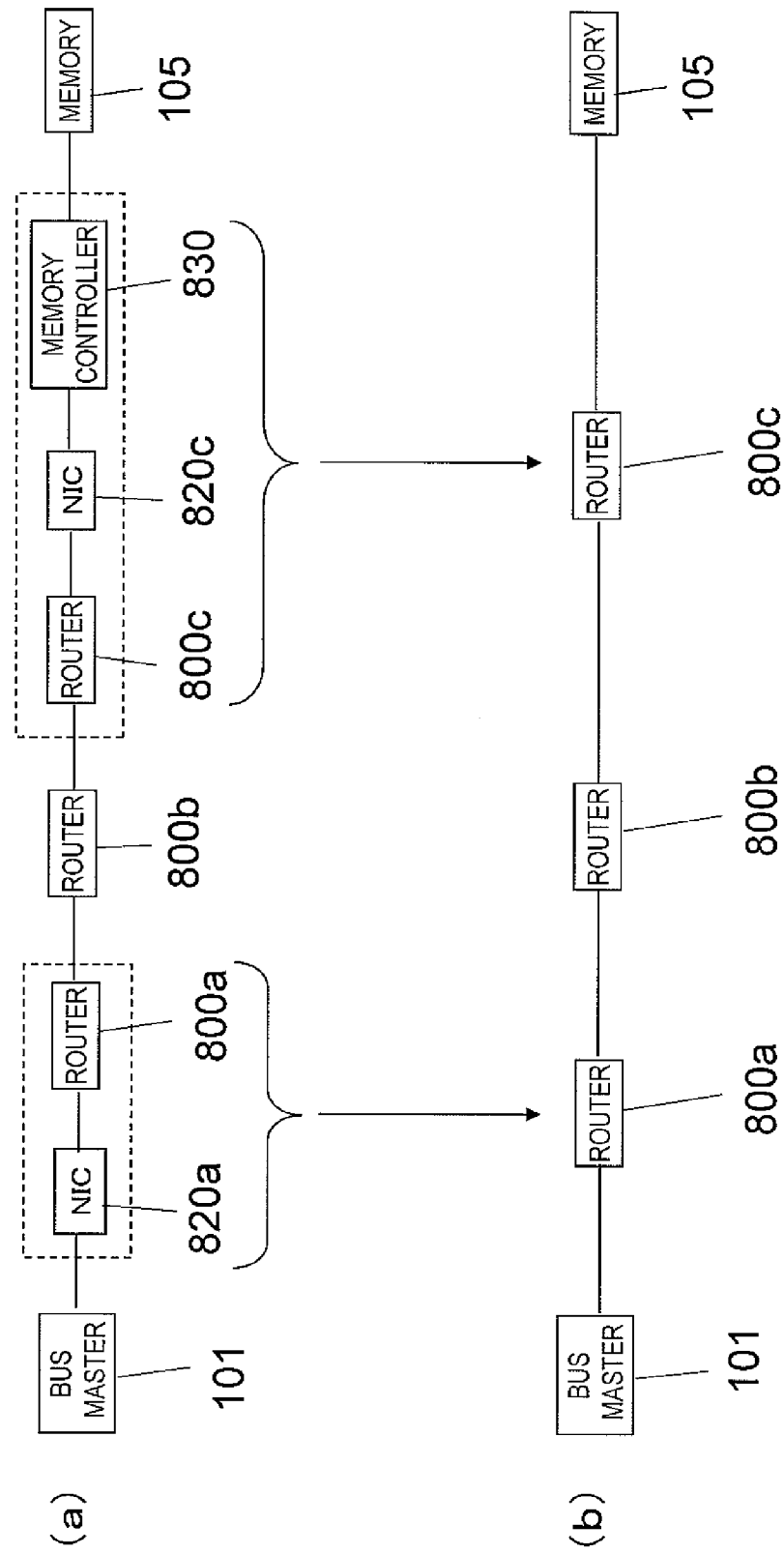

FIG. 3 is a block diagram illustrating a part of a data transfer system according to this embodiment. In FIG. 3, only a bus master 101, a router 800a in the first group, a router 800b in the second group, a router 800c in the third group, and a memory 105, which are connected as a set to a single transmission path, are illustrated for the sake of simplicity.

As shown in portion (a) of FIG. 3, an NIC 820a is connected between the bus master 101 and the router 800a in the first group. The NIC 820a has the function of performing bus protocol conversion processing and the function of choosing a memory 105 that can afford to have the memory size required by the bus master 101 from multiple memories and notifying the bus master 101 of the memory 105 chosen.

On the other hand, between the router 800c in the third group and the memory 105, connected are another NIC 820c and a memory controller 830. The NIC 820c performs bus protocol conversion processing, defines the correlation between the go-to route and the return-from route in a data transfer, and sends a response from the return-from route to the go-to route to the NIC 820a. In this description, the "go-to route" refers herein to a transmission path leading from the bus master 101 to the memory 105, and the "return-from" route refers herein to a transmission path leading from the memory 105 to the bus master 101. The memory controller 830 is connected to the NIC 820a and controls the order of having access to the memory 105.

In this description, illustration of the NICs 820a and 820c and the memory controller 830 is omitted for the sake of simplicity as shown in portion (b) of FIG. 3. That is to say, in the following description, every router illustrated as being directly connected to a transmitting node such as the bus master 101 actually includes an NIC. In the same way, every router illustrated as being directly connected to a receiving node such as the memory 105 actually includes an NIC and a memory controller.

Hereinafter, the structures of packets and flits according to this embodiment will be described.

Figure 4:
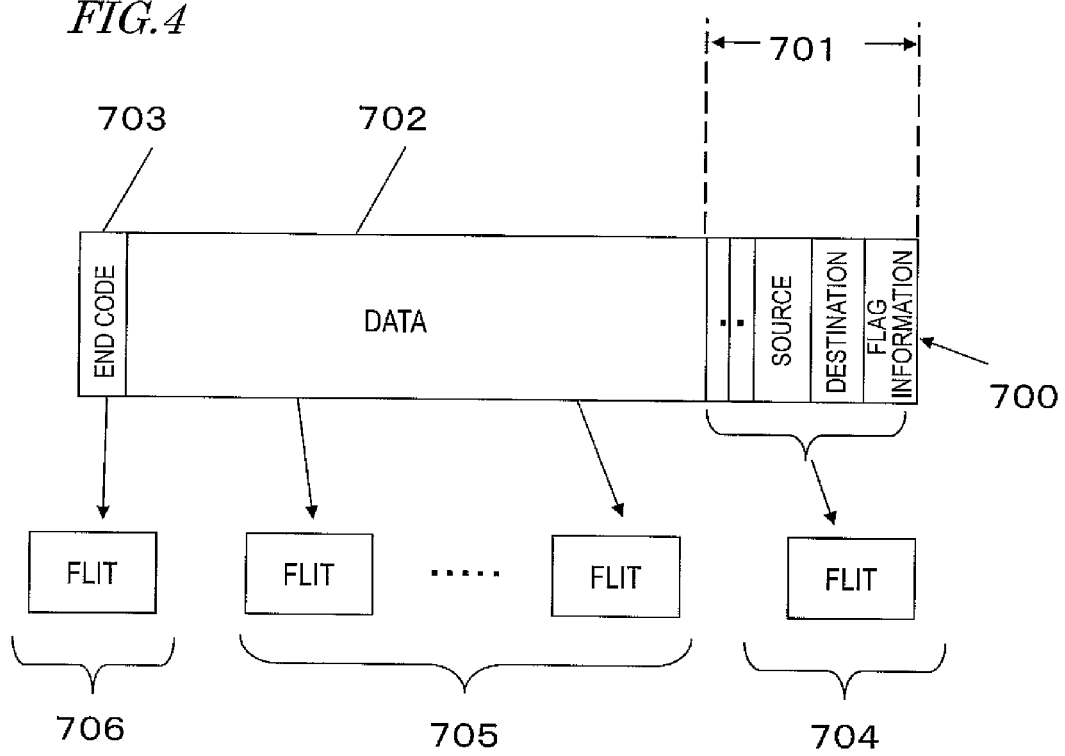

FIG. 4 illustrates an exemplary transfer format for a packet 700 and how the packet 700 may be divided into a plurality of flits. The packet 700 includes a header field 701, a data field 702, and a control code field 703.

In the header field 701, described are flag information indicating that this is the head of a packet, the destination address, and the source address. Any other kind of information may be described in the header field 701. Among those kinds of data in the header field 701, the destination address and the source address are used to perform the processing of relaying the packet 700 and the processing of receiving the packet 700 at the receiving end.

In the data field 702, described are video data and audio data, for example. In the control code field 703, a predetermined end code may be described, for example. The end of the packet 700 can be detected with the end code. In the control code field 703, any kinds of information other than the end code may also be stored.

The bus master 101 transfers the packet 700 after having broken down the packet 700 into smaller packet units called "flits". The size of one flit is determined by the width of the bus so that one flit can be transferred in one cycle through the bus. The packet 700 is divided into a header flit 704, a plurality of data flits 705 and a tail flit 706. In the header flit 704, flag information and destination address information that are stored in the header field 701 may be included.

In the flits that follow the header flit 704 (namely, the data flits 705 and the tail flit 706), no address information that specifies the destination is stored. The reason is that those flits following the header flit 704 are sent to the same destination as the header flit's 704. When the destination is determined by the header flit 704 and when it is determined what output buffer will output the flit of that traffic flow, the flits that follow it will be transferred to the destination specified by the header flit 704 using the same output buffer as the header flit's 704.

T0 the tail flit 706, attached is flag information indicating that this is the last one of the flits that form that packet (i.e., an end code stored in the control code field 703). The data flits 705 other than the header flit 704 and the tail flit 706 are flits that are used mainly to transfer data and correspond to the data field 702 of the packet 700.

On detecting the flag information (i.e., the end code) that is described in the tail flit 706, the memory 105 on the receiving end restores those flits transferred into the original packet based on that end code.

For example, one packet may have a size of 128 bytes and one flit may have a size of 32 or 64 bits. It should be noted, however, that the one packet and one flit sizes could vary according to the intended application and these are nothing but examples. Optionally, the length of one flit may be basically defined to be long enough to describe control data such as the destination address and the source address.

Each of the routers includes an input buffer that accumulates the incoming flits. Those flits are once accumulated in the input buffer and then sent to either a router leading to the destination memory or directly to the destination memory itself by turning the crossbar switch. In the exemplary configuration shown in FIG. 2, the flits are supposed to be transmitted from the bus master 101 to the memory 105. However, this is only an example. If a different configuration from the one shown in FIG. 2 is adopted, the destination of the flits is not necessarily a memory but may also be another bus master or an input/output interface to be connected to a peripheral device, for example.

Next, a configuration for a router according to this embodiment will be described.

Figure 5:
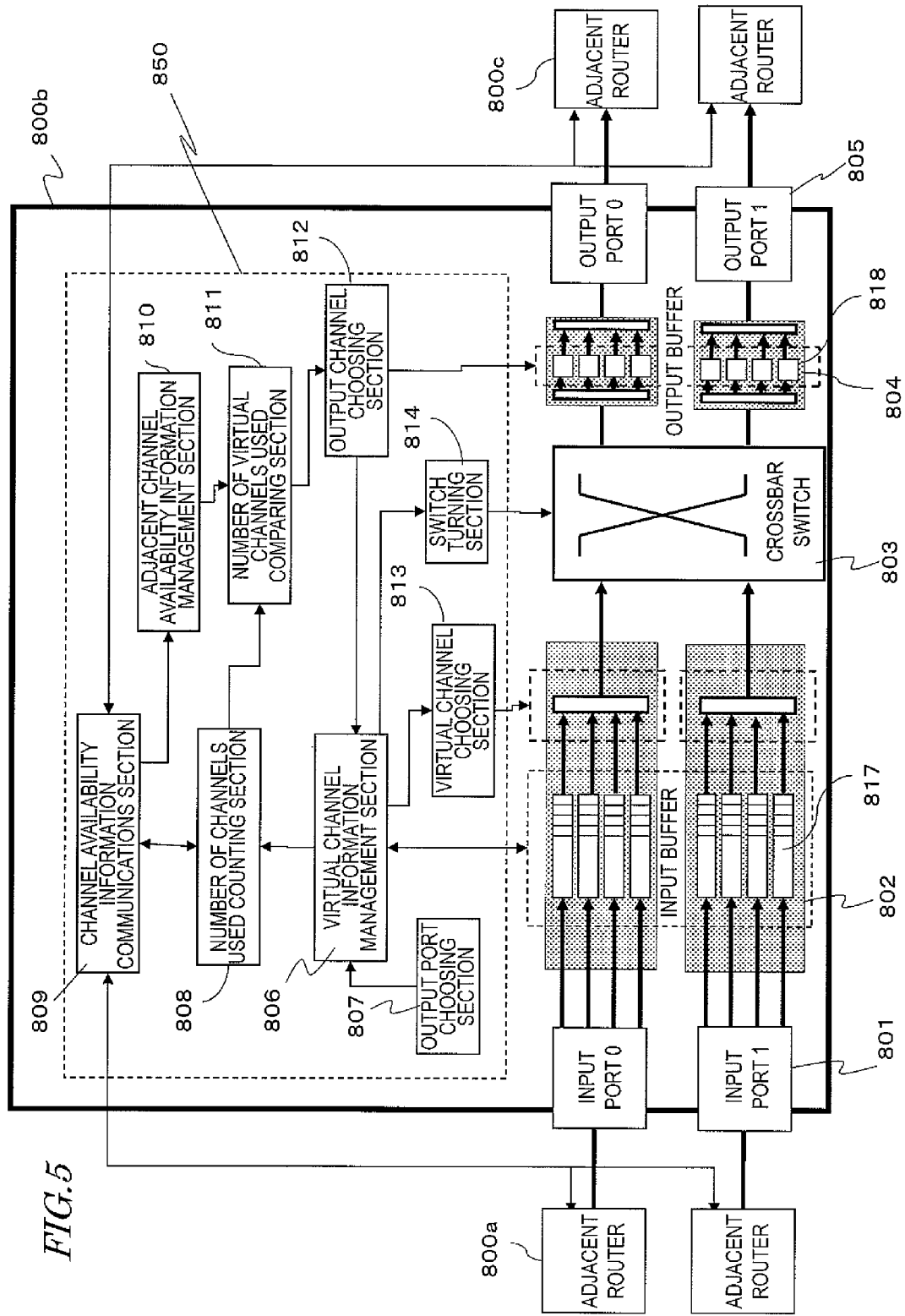
FIG. 5 illustrates a configuration for a router according to the first embodiment.

FIG. 5 is a block diagram illustrating a configuration for a router according to this embodiment. Although the configuration of a router 800*b* in the second group will be described as an example, routers in the first and third groups just have different destinations and sources but have the same basic configuration. In the following description, the router 800*a* in the first group will be sometimes referred to herein as a "router on the previous stage" and the router 800*c* in the third group will be sometimes referred to herein as a "router on the next stage". And the routers in the first and third groups will be sometimes referred to herein as "adjacent routers". The router 800*b* determines a route from the router 800*a* on the previous stage to the router 800*c* on the next stage and relays the traffic flow between them.

The router 800*b* includes input ports 801, input buffers 802, a crossbar switch 803, output buffers 804, output ports 805 and an arbiter 850. The arbiter 850 includes a virtual channel information management section 806, an output port choosing section 807, a number of channels used counting section 808, a channel availability information communications section 809, an adjacent channel availability information management section 810, a number of virtual channels used comparing section 811, an output channel choosing section 812, a virtual channel choosing section 813, and a switch turning section 814. The arbiter 850 may be implemented as a logic circuit that is configured to be able to perform the operations to be described later. The input buffers 802 and output buffers 804 are temporary storage areas such as SRAMs or registers. The crossbar switch 803 is a known switch circuit.

Hereinafter, the functions of these components will be described one by one.

The input ports 801 are interfaces that receive a packet from the adjacent routers 800*a* on the previous stage through the bus. Although two input ports #0 and #1 are provided in the exemplary configuration shown in FIG. 5, the number of input ports provided does not have to be two. In this embodiment, mutually different adjacent routers 800*a* are connected to the input ports #0 and #1, respectively.

The output ports 805 are interfaces that send a packet to the adjacent routers 800*c* on the next stage through the bus. Although two output ports #0 and #1 are provided in the exemplary configuration shown in FIG. 5, the number of output ports provided does not have to be two. In this embodiment, mutually different adjacent routers 800*c* are connected to the output ports #0 and #1, respectively.

Each input buffer 802 accumulates the flits that have been received from an adjacent router 800*a* (or a bus master 101). One temporary buffer functioning as the input buffer 802 may be provided for each input port of the router 800*b*. Or multiple virtual channels 817 may be provided for each input port so that the transmission schedule can be controlled by using respective channels for packets with different destinations. In this embodiment, four virtual channels 817 are supposed to be provided for each input buffer 802 as shown in FIG. 5.

The crossbar switch 803 is a switch for changing connections between the input and output ports 801 and 805 of the router 800*b*. In the configuration illustrated in FIG. 5, the flit received at each input port is output through one of the output ports #0 and #1 via the crossbar switch 803.

Each output buffer 804 is used to send flits to the adjacent router 800*c* via its associated output port 805. Each output buffer 804 further has multiple output channels 818. The output channels 818 provided need to be as many as the virtual channels of the input buffers in the adjacent router 800*c*. And a one-to-one correspondence is defined between those output channels 818 and the virtual channels of the adjacent router 800*c*.

The flits that have been transmitted from this router 800*b* are stored in a virtual channel of the adjacent router 800*c*, which is associated with the output channel 818 that has been used to send those flits. That is to say, by choosing an output channel 818, the router 800*b* can designate in which of the virtual channels of the adjacent router 800*c* the flits transmitted should be stored next.

Even though the input buffers 802 and output buffers 804 are each comprised of channels that are made up of multiple virtual lines according to this embodiment, each buffer may also be comprised of multiple physical channels as well.

The virtual channel information management section 806 manages information about the flits that are stored in each virtual channel 817. Details of the information to be managed by the virtual channel information management section 806 will be described later with reference to FIG. 6.

When a header flit is newly stored in a virtual channel 817, the output port choosing section 807 chooses a router 800c to which the flits need to be passed next by reference to the destination information (i.e., the destination address) that is described in the header flit. The router 800c can be chosen by selecting one of the output ports #0 and #1.

The number of channels used counting section 808 counts the number of virtual channels used in each input buffer 802 on a traffic flow basis. In this description, the "traffic flow" refers herein to a set of flits which have the same destination address. By reference to the information managed by the virtual channel information management section 806, the number of channels used counting section 808 counts the number of virtual channels 817 in which flits with the same destination address are stored.

The channel availability information communications section 809 exchanges information about the number of virtual channels used by each traffic flow (which will be referred to herein as "channel availability information") with the adjacent routers 800a and 800c. Specifically, the channel availability information communications section 809 sends the channel availability information, which has been obtained by the number of channels used counting section 808, to the adjacent routers 800a and 800c and receives channel availability information from each of the routers 800a and 800c on the next stage. In this manner, each router can see how many virtual channels are used in the adjacent routers.

The adjacent channel availability information management section 810 stores the virtual channel information that has been obtained from the adjacent routers 800a and 800c via the channel availability information communications section 809. The information to be managed by this adjacent channel availability information management section 810 will be described in further detail later with reference to FIG. 6.

The number of virtual channels used comparing section 811 compares the number of virtual channels used by each traffic flow in its own router 800b to the number of virtual channels used by each traffic flow in the adjacent routers 800a and 800c. As a result, the magnitude of the bias in the number of virtual channels used between the respective routers on the transmission path can be estimated quantitatively on a traffic flow basis.

The output channel choosing section 812 determines allocation of the output channels 818 to the virtual channels 817 based on a result of the quantitative comparison that has been made by the number of virtual channels used comparing section 811. The processing to be performed by this output channel choosing section 812 will be described in detail later with reference to FIGS. 15 to 17.

The virtual channel choosing section 813 chooses a candidate virtual channel 817 to which a flit is going to be sent from among a number of virtual channels 817 on the basis of the input buffer 802. It will be described later how to choose the candidate.

The switch turning section 814 determines an exclusive combination of the candidate virtual channel 817 that has been chosen one by one on an input buffer (802) basis by the virtual channel choosing section 813 and the output port 805 and turns the crossbar switch 803 based on that result.

Next, the contents of the virtual channel information according to this embodiment will be described.

FIG. 6 shows exemplary contents of virtual channel information 901 to be stored in the virtual channel information management section 806. To distinguish the respective virtual channels 817, the virtual channel information 901 includes an input port number to identify the input port 801 and a virtual channel number to identify the virtual channel 817. When a flit is stored in any of the virtual channels 817, destination address information to find the destination of that flit, the number of the output port 805 for use to send that flit to its destination, and the number of the output channel 818 used are written.

If the router 800b has the configuration shown in FIG. 5, for example, then information about eight virtual channels is managed as shown in FIG. 6 because the router 800b has two input ports, for each of which four virtual channels are provided. The virtual channel information shown in FIG. 6 indicates that flits are stored in Virtual Channels #1 and #2 of Input Port #0 and in Virtual Channels #0 to #2 of Input Port #1. In this example, no output channel has been allocated yet to Virtual Channel #1 of Input Port #0 or to Virtual Channel #1 of Output Port #1. In a situation where no virtual channels are used (in Virtual Channels #0 and #3 of Input Port #0 and in Virtual Channel #3 of Input Port #1 in the example shown in FIG. 6), no destination addresses are used and no output port number or output channel number has been set yet.

In the virtual channel information 901, each destination address reflects the address information of the destination that is described in the header flit 704 that has been delivered to the virtual channel 817. Also, when the tail flit 703 including the end code is sent from the virtual channel 817, information about the destination address, the output port number and the output channel number at the virtual channel is initialized. Next, the contents of the adjacent channel availability information will be described.

FIG. 7 shows the contents of the adjacent channel availability information 1001 to be stored in the adjacent channel availability information management section 810. As the adjacent channel availability information 1001, stored are the identification number (i.e., the connection port number) of an input or output port that connects its own router to an adjacent router, the destination address of a flit that is stored in a virtual channel used in the adjacent router that is identified by the connection port number, and the number of virtual channels used on a destination address basis. Optionally, instead of the connection port number, an identification number to identify the adjacent router may also be stored. Since the router 800b shown in FIG. 5 is adjacent to four routers via the two input ports #0 and #1 and the two output ports #0 and #1, four sets of adjacent channel availability information are managed as shown in FIG. 7.

Hereinafter, it will be outlined with reference to FIGS. 8 to 14 how the router 800b operates.

Figure 8:
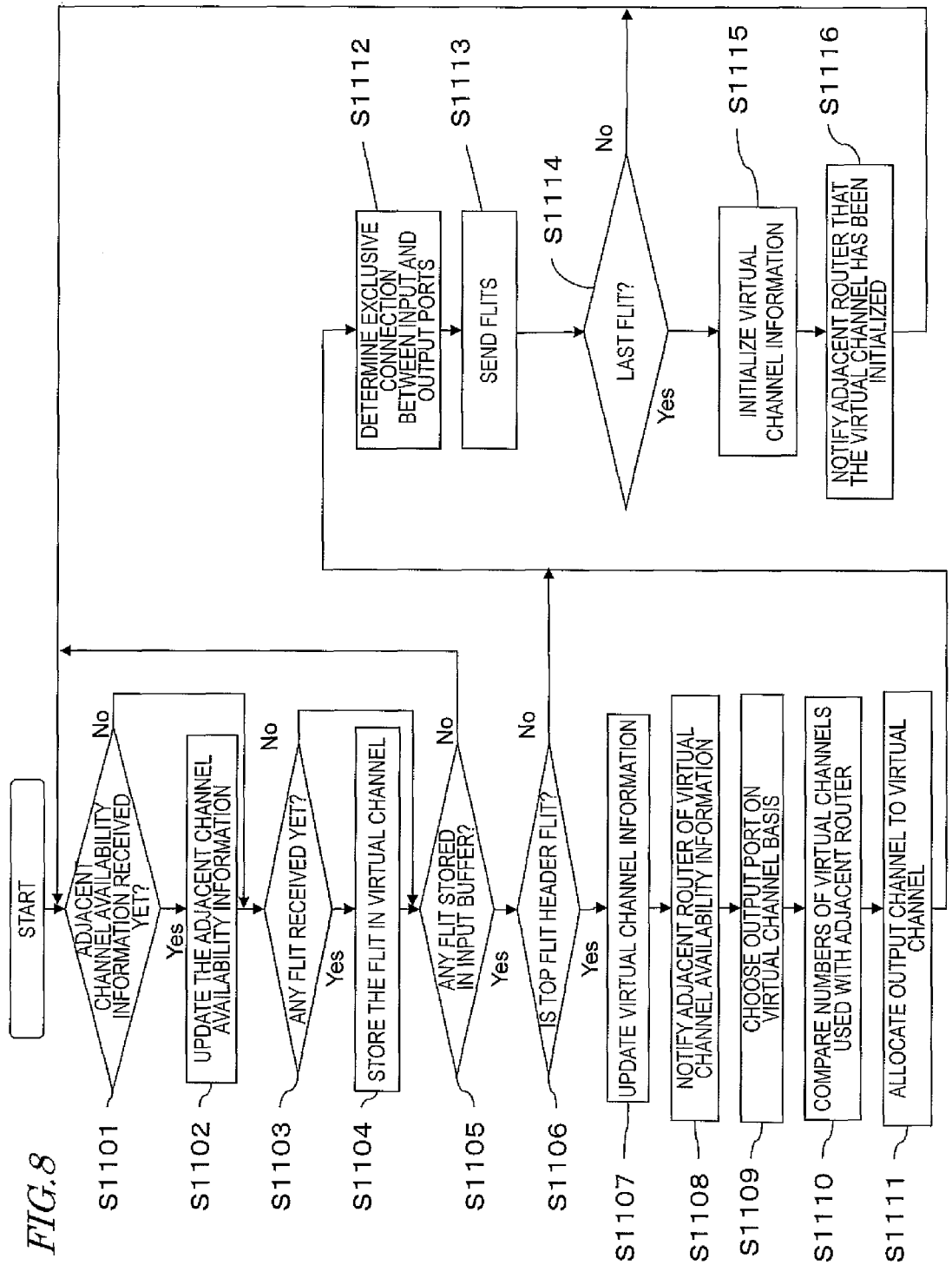
FIG. 8 is a flowchart showing a procedure in which the router of the first embodiment operates.

FIG. 8 is a flowchart showing the procedure of the processing carried out by the router 800b. First of all, in Step S1101, the channel availability information communications section 809 determines whether or not information about the availability of respective virtual channels has been received from any adjacent router. If the answer is YES, the process advances to Step S1102, in which the adjacent channel availability information management section 810 updates the adjacent channel availability information based on the information thus obtained. On the other hand, if no adjacent channel availability information has been received yet, then the process advances to Step S1103 with the processing step S1102 skipped.

Now the router 800b has gotten ready to receive, via the input port 801, a flit from either the router 800a that is adjacent to itself or a transmitting node (i.e., bus master 101).

Figures 9A, 9B:
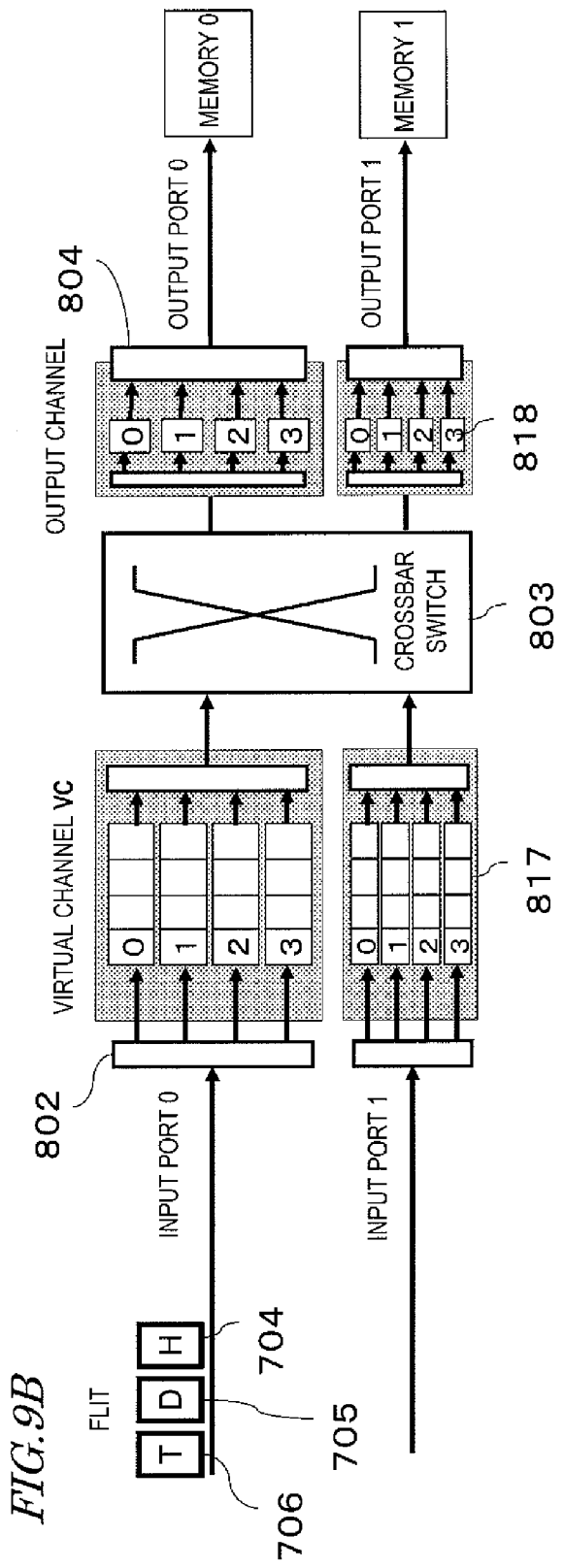
FIGS. 9A and 9B show how the router of the first embodiment operates.

The state of the virtual channel 817 at this point in time is shown in FIGS. 9A and 9B. Specifically, FIG. 9A shows the virtual channel information 901 with respect to Input Port #0 in a situation where the router 800b has not received any flits yet and FIG. 9B illustrates how the respective buffers are used in such a situation. In the following description, only the virtual channel information 901 with respect to Input Port #0 will be described as an example. It should be noted that after the router 800b has just been started, no flits have been received yet, and therefore, every virtual channel is still unused.

Next, in Step S1103 shown in FIG. 8, the input port 801 determines whether or not any flit has been received. If the answer is YES, the process advances to Step S1104. Otherwise, the process advances to Step S1105.

In Step S1104, the input port 801 stores the received flit in the virtual channel 817, which has already been selected in advance by the adjacent router on the previous stage.

Next, in Step S1105, the virtual channel information management section 806 determines whether or not any flit is stored in the input buffer 802 of the router 800. If the answer is YES, the process advances to Step S1106. Otherwise, the process goes back to the processing step S1101.

In Step S1106, the virtual channel information management section 806 determines whether or not the flit stored at the top of each virtual channel 817 is a header flit. If the answer is YES, the process advances to Step S1107. Otherwise, the process advances to Step S1112.

In Step S1107, the virtual channel information management section 806 adds the destination address, which is described in the header flit stored at the top of the virtual channel 817, to the virtual channel information 901.

Figures 10A, 10B:
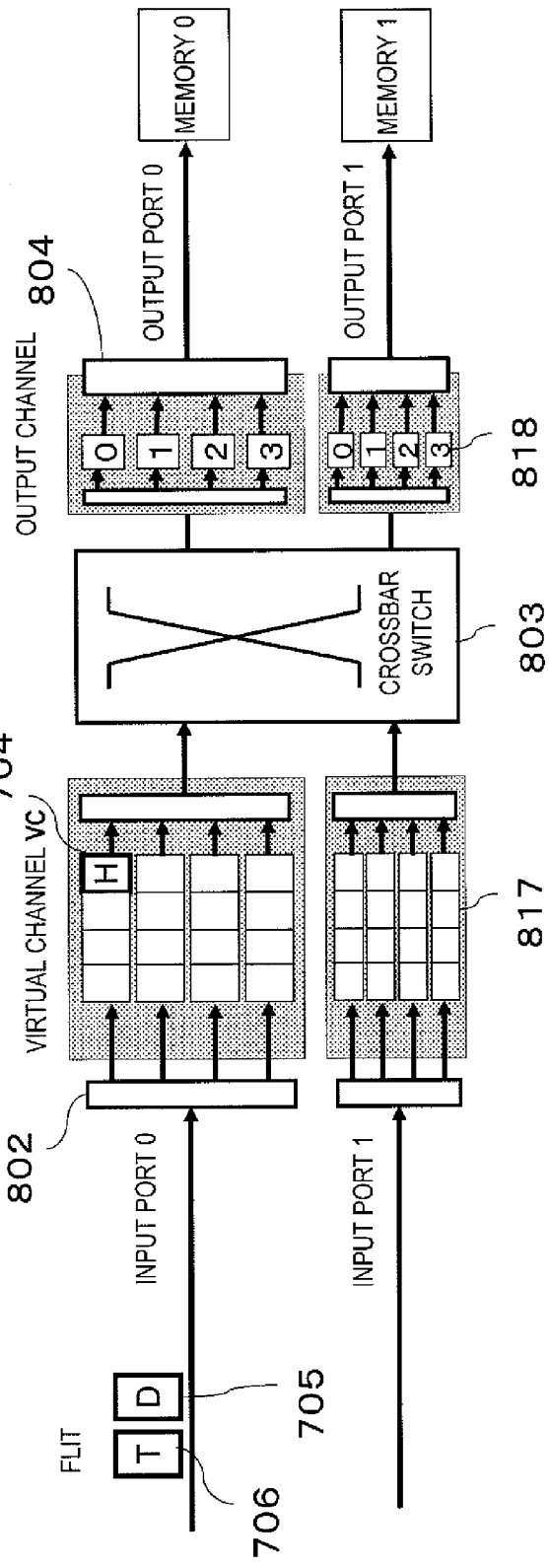
FIGS. 10A and 10B show how the router of the first embodiment operates.

The state of the virtual channel 817 at this point in time is shown in FIGS. 10A and 10B. Specifically, FIG. 10A shows the virtual channel information 901 in a situation where the header flit 704 has arrived at the router 800 and has just gotten stored in the virtual channel 817. On the other hand, FIG. 10B illustrates how the respective buffers are used when the header flit 704 that has been received at Input Port #0 is stored in Virtual Channel #0 in Step S1104.

When the header flit 704 arrives at the virtual channel, the destination address described in the header flit 704 (e.g., Memory #0's address "000" in the example shown in FIGS. 10A and 10B) is added to the virtual channel information 901.

Subsequently, in Step S1108 shown in FIG. 8, the number of channels used counting section 808 counts, by reference to the virtual channel information management section 806, the number of virtual channels 817 used on a destination address basis. Then, the channel availability information communications section 809 notifies the adjacent routers 800a and 800c of the number of virtual channels 817 used on a packet destination address basis, which has been counted by the number of channels used counting section 808. For example, in the state shown in FIGS. 10A and 10B, only one virtual channel 817 is used by the packet headed to the destination address "000". Thus, the adjacent routers 800a and 800c are notified of that information.

In the next processing step S1109, the output port choosing section 807 determines, by reference the virtual channel information 901, what output port 805 should be used with respect to a virtual channel, of which the number of the output port 805 has not been set yet. In this embodiment, the output port 805 is chosen based on the destination address of each packet. For example, in the multistage interconnection network with the configuration shown in FIG. 2, an address represented by a three-digit binary number, is assigned to each memory and the address assigned to the destination memory is described in the header flit of each packet. The output port choosing section 807 of each router reads, as counted from the right, the numerical value of the three-digit address assigned to the header flit at the same digit as the number of stages of the router. And if that value is "0", the route is determined so that the flit is sent to the router on the output port #0 side. On the other hand, if that value is "1", the route is determined so that the flit is sent to the router on the output port #1 side.

For instance, in the example shown in FIG. 2, if data needs to be sent from the bus master BM2 to Memory #5 (with the address "101"), the router R1 on the third stage (i.e., in the $1^{st}$ G) as viewed from the destination memory refers to the third digit from the right of the address "101" to Memory #5 based on the three-digit numeral representing that address. As that value is "1" in this case, the flit is sent to the router R7 on the output port #1 side. Next, the router R7 refers to the second digit from the right of the address "101" to Memory #5. As that value is "0" in this case, the flit is sent to the router R10 on the output port #0 side. Finally, the router R10 refers to the first digit from the right of the address to Memory #5. As that value is "1" in this case, the flit is sent to Memory #5 on the output port #1 side. In this manner, a transmission path leading from the bus master BM2 to Memory #5 is determined and the flit is transferred to its destination.

As long as a route through which a packet can be delivered to its destination can be selected according to the topology of the distributed bus, the output port choosing section 807 does not always have to choose the output port just as described above.

Figures 11A, 11B:
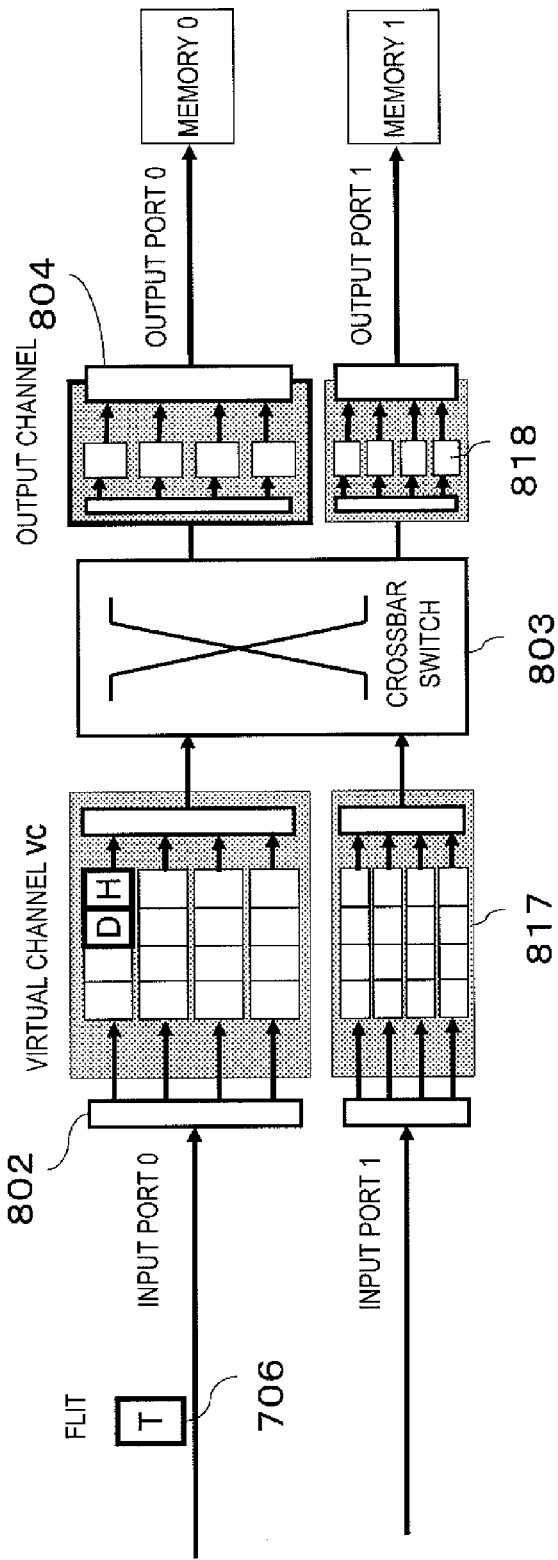
FIGS. 11A and 11B show how the router of the first embodiment operates.

FIG. 11A shows the contents of the virtual channel information 901 after the output port 805 has been allocated to the virtual channel 817 in the router 800b. FIG. 11B shows how the respective virtual channels 817 are used in the router 800b. In FIG. 11A, a flit to be sent to Memory #0 with the destination address "000" is stored in Virtual Channel #0 of Input Port #0. That is why the output port choosing section 807 sets the value of the output port number to be "0" in order to transmit the flit through Output Port #0 leading to Memory #0.

Next, in Step S1110 shown in FIG. 8, the number of virtual channels used comparing section 811 refers to the adjacent channel availability information 1001 managed by the adjacent channel availability information management section 810 and information about the number of virtual channels used in its own router, which has been counted by the number of channels used counting section 808. Then, the number of virtual channels used comparing section 811 compares the number of virtual channels used by its own router to the number of virtual channel used by the adjacent router 800a, 800c on a destination address basis and calculates their difference.

Subsequently, in Step S1111, based on a result of the comparison that has been made by the number of virtual channels used comparing section 811, the output channel choosing section 812 determines what virtual channels should be allocated to the output channel 818, to which virtual channels 817 have not been allocated yet.

Figures 12A, 12B:
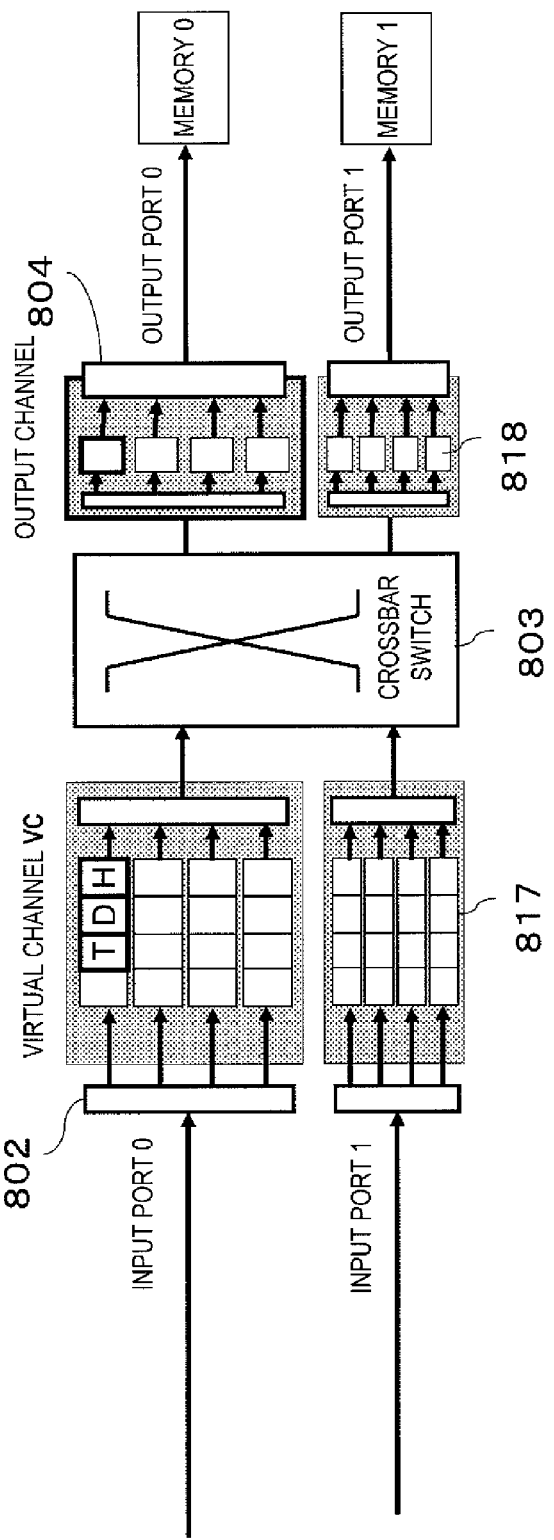
FIGS. 12A and 12B show how the router of the first embodiment operates.

FIG. 12A shows the contents of the virtual channel information 901 at a point in time when the output channel 818 has already been allocated in the router 800b. FIG. 12B illustrates how the respective buffers are used in that situation. As shown in FIG. 12B, all of the output channels 818 associated with Output Port #0 are unused. According to this embodiment, to make the flit that is stored in Virtual Channel #0 at Input Port #0 use Output Port #0, the output channel number is set to be "0" as shown in FIG. 12A. As to exactly how to allocate the output channels 818, it will be described later with reference to FIGS. 15, 16A and 16B.

Next, in Step S1112 shown in FIG. 8, the virtual channel choosing section 813 chooses one virtual channel 817, to which an output channel 818 has already been allocated, on an input port (801) basis by reference to the virtual channel information 901. In the meantime, the switch turning section 814 determines, by reference to the virtual channel information 901, if any of the virtual channels that have been chosen by the virtual channel choosing section 813 on an input port (801) basis uses the same output port 805. If the answer is YES (i.e., if any contention has arisen), one of multiple virtual channels 817 that are contending with one another is chosen. In this manner, an exclusive connection is determined between one virtual channel 817 at each input port and the output port 805. And based on that result, the switch turning section 814 turns the crossbar switch 803.

After the crossbar switch 803 has been turned, the virtual channel 817 that has been chosen by the virtual channel selecting section 813 sends the flit through the output channel 818 of the output port 805 specified by the virtual channel information 901 in Step S1113.

Figures 13A, 13B:
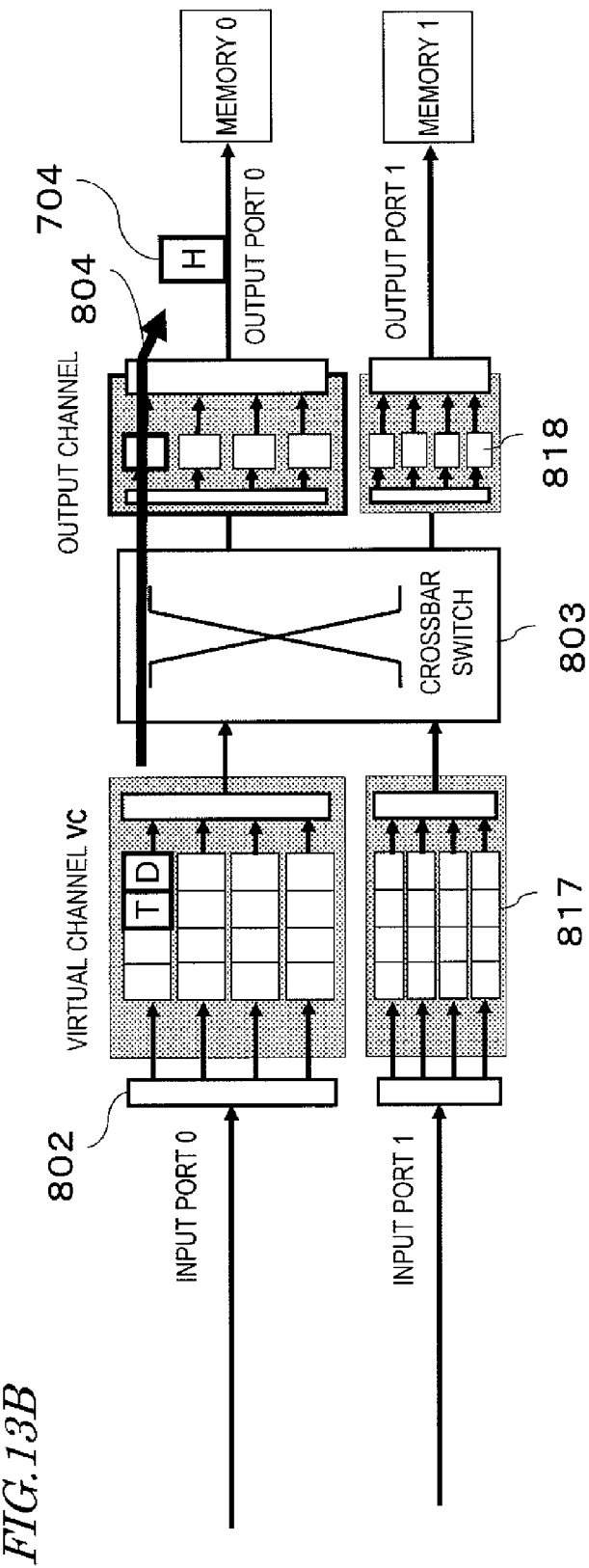
FIGS. 13A and 13B show how the router of the first embodiment operates.

FIG. 13A shows the contents of the virtual channel information 901 at a point in time when the router 800b is sending the flit, while FIG. 13B shows how the respective buffers are used in such a situation. In the example illustrated in FIGS. 13A and 13B, as there is only one packet in the router 800b, flits in Virtual Channel #0 associated with Input Port #0 are sequentially sent one after another to Memory #0 as their destination through Output Channel #0 associated with Output Port #0 specified by the virtual channel information 901. In FIG. 13B, the adjacent router located between its own router and the memory is not illustrated.

Next, in Step S1114 shown in FIG. 8, the virtual channel 817 determines, before sending a flit, whether or not that flit is the last one of those forming a packet (i.e., whether or not that flit is a tail flit). If the answer is YES, the process advances to Step S1115. Otherwise, the process goes back to the processing step S1101. In Step S1115, the virtual channel information management section 806 initializes information about that virtual channel and releases its hold on that virtual channel so that another packet can use that virtual channel.

FIG. 14A shows how the virtual channel information 901 has changed once the tail flit 706 has been sent out, while FIG. 14B shows how the respective channels are in such a situation. In FIGS. 14A and 14B, since the tail flit 706 has been sent, every flit in Virtual Channel #0 associated with Input Port #0 has all been sent and that virtual channel has now become unused again. Thus the virtual channel information management section 806 initializes information about Virtual Channel #0 in the virtual channel information 901.

Subsequently, in Step S1116 shown in FIG. 8, the number of channels used counting section 808 counts on a destination address basis, by reference to the virtual channel information 901 stored in the virtual channel information management section 806, how many virtual channels 817 are used. Then, the number of channels used communications section 809 notifies the adjacent routers 800a and 800c of the information about the number of virtual channels 817 used, which has been counted on a packet destination address basis by the number of channels used counting section 808. In this manner, the adjacent routers 800a and 800c can be notified that the virtual channel has been initialized.

By performing this series of processing steps S1101 through S1116 a number of times, each router 800 can send an incoming packet to the receiving node as the destination.

Next, the processing step S1111 of allocating an output channel 818 to a virtual channel 817 if a header flit 704 has been stored in that virtual channel 817 will be described with reference to FIGS. 15, 16A and 16B.

Figure 15:
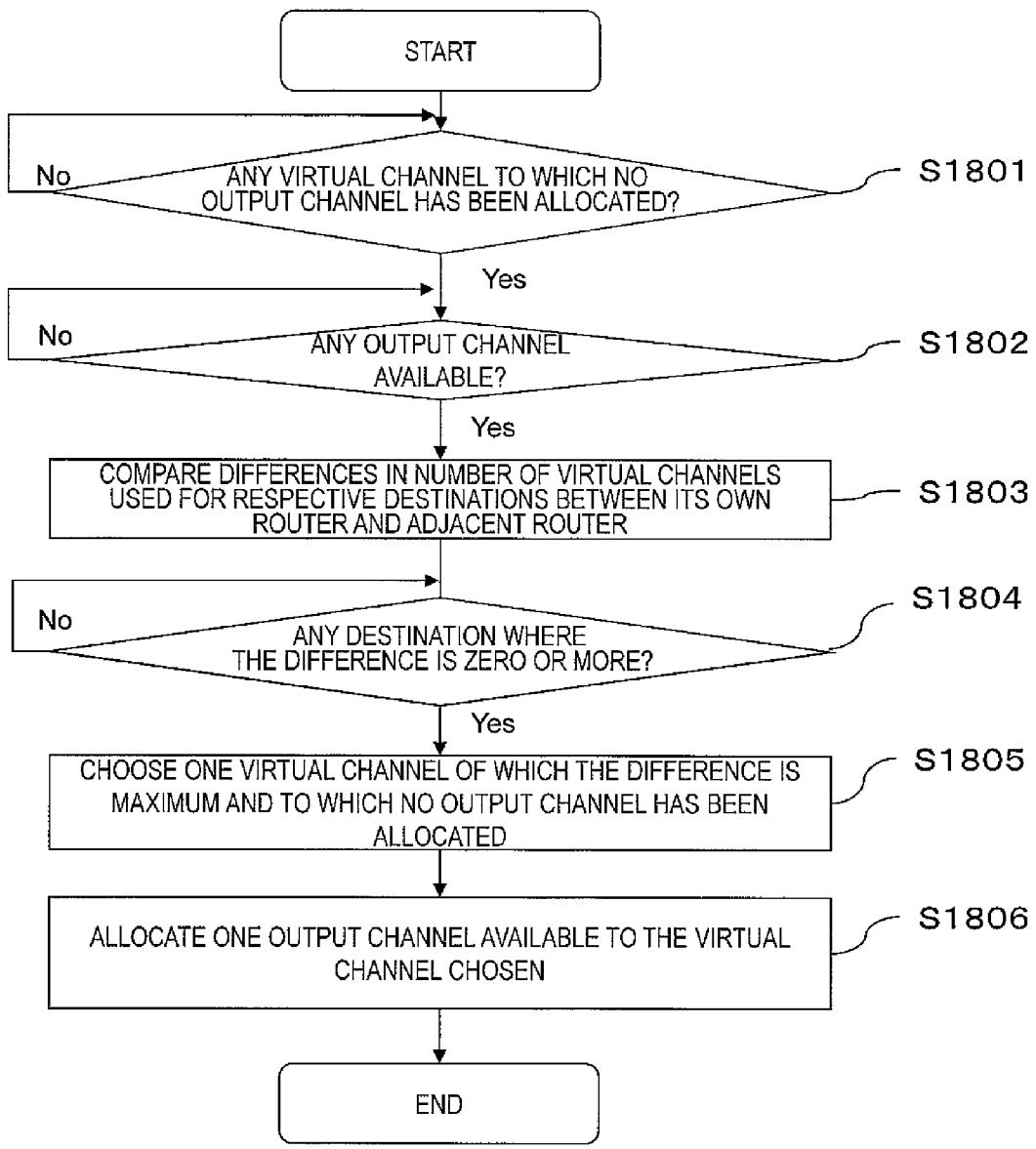
FIG. 15 is a flowchart showing a procedure in which the router of the first embodiment allocates channels.
Figures 16A, 16B:
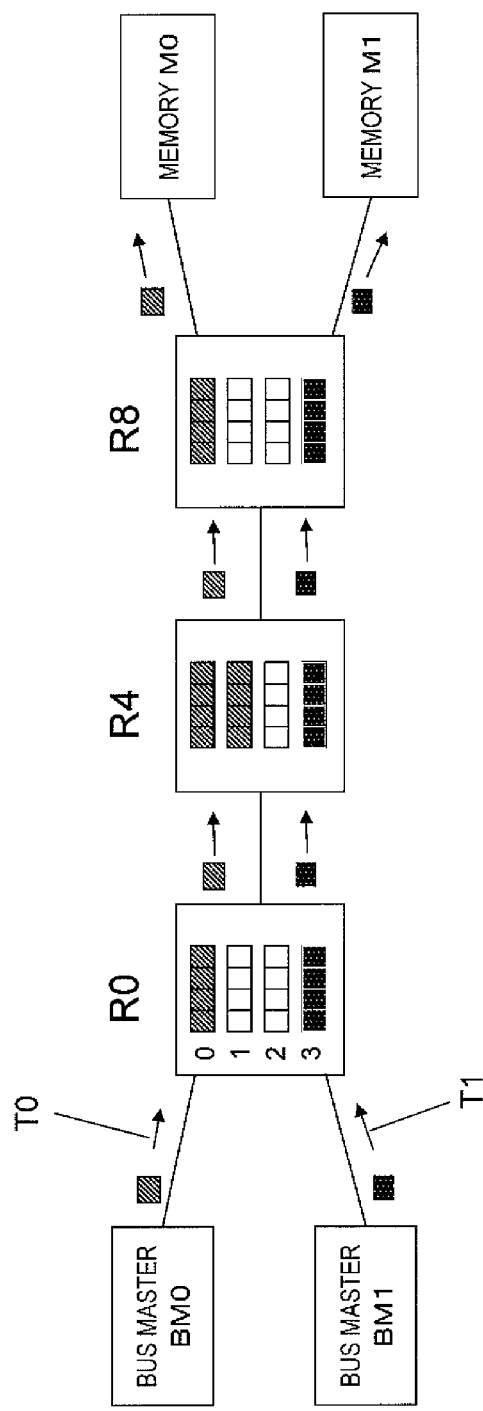
FIGS. 16A and 16B show how the router of the first embodiment operates.

FIG. 15 is a flowchart showing the procedure of processing in which the output channel choosing section 812 allocates the output channel 818 to the virtual channel 817, while FIGS. 16A and 16B show how virtual channels are used at an instant in each router according to this embodiment. Specifically, FIG. 16A shows how virtual channels are used at a point in time when two bus masters BM0 and BM1 are transferring traffic flows to two memories M0 and M1 via three routers R0, R4 and R8. In FIG. 16A, other bus masters, routers and memories that have nothing to do with the transmission or reception are not illustrated. Meanwhile, FIG. 16B shows the contents of the virtual channel information stored in the router R0 at that point in time.

Each of the routers R0, R4 and R8 shown in FIG. 16A has four virtual channels. In the following description, association of those virtual channels with input ports will not be considered for the sake of simplicity. In FIG. 16A, the traffic flow transferred from the bus master BM0 to the memory M0 is identified by T0 and the traffic flow transferred from the bus master BM1 to the memory M1 is identified by T1 as in FIGS. 1A and 1B. Also, in order to distinguish those traffic flows T0 and T1 easily, the virtual channels are supposed to be sequentially allocated to the traffic flows T0 and T1 from top to bottom and from bottom to top, respectively, in each of the routers R0, R4 and R8. It should be noted that the method shown in FIG. 16A is just an exemplary method for allocating virtual channels and any of various other methods for allocating virtual channels on a packet by packet basis may also be adopted as well.

In Step S1801 shown in FIG. 15, the output channel choosing section 812 determines, by reference to the virtual channel information 901 stored in the virtual channel information management section 806, whether or not there is any virtual channel to which an output port 805 has been allocated but to which no output channel has been allocated yet. If the answer is YES, the process advances to Step S1802. Otherwise, the same processing step S1801 is performed all over again.

For example, in the router R0 shown in FIGS. 16A and 16B, output ports 805 have already been allocated, but no output channels 818 have been allocated yet, to virtual channels #0 and #3. That is why the process advances to Step S1802.

In Step S1802, the output channel choosing section 812 determines, by reference to the virtual channel information 901 stored in the virtual channel information management section 806 and the output buffer 804, whether or not there is any output channel 818 available that is not used by any virtual channel 817. If the answer is YES, the process advances to Step S1803. Otherwise, this processing step S1802 is performed all over again.

In the example illustrated in FIGS. 16A and 16B, Virtual Channels #0, #1 and #3 of the router R4 are already used but virtual Channel #2 thereof is still unused and available. Since there is one to one correspondence between the identification number of each output channel 818 of the router R0 and that of its associated virtual channel of the router R4 according to this embodiment, it can be seen that Output Channel #2 of the router R0 is also unused and available. That is why as for the router R0, the process advances to Step S1803.

In Step S1803, the output channel choosing section 812 refers to the information about the difference in the number of virtual channels used for respective traffic flow destinations between its own router and an adjacent router, which has been obtained by the number of virtual channels used comparing section 811. Then, by reference to that differential information, the output channel choosing section 812 compares the differential values to each other on the basis of each of the traffic flow destinations that are stored in the virtual channel 817 to which an output port 805 has already been allocated but to which no output channel 818 has been allocated yet.

FIG. 17 shows how many virtual channels are used by the traffic flows addressed to the memories M0 and M1 in each of the routers R0, R4 and R8 shown in FIG. 16A and what is the difference in the number of virtual channels used between the routers on the transmitting and receiving ends. In the situation shown in FIG. 16A, in the router R0, the traffic flow addressed to the memory M0 uses one virtual channel, and the traffic flow addressed to the memory M1 also uses one virtual channel. In the router R4, the traffic flow addressed to the memory M0 uses two virtual channels, and the traffic flow addressed to the memory M1 also uses one virtual channel. And in the router R8, the traffic flow addressed to the memory M0 uses one virtual channel, and the traffic flow addressed to the memory M1 also uses one virtual channel. That is why the difference in the number of virtual channels used between the router R0 and the router R4 on the receiving end becomes "−1" for the traffic flow addressed to the memory M0 but becomes "0" for the traffic flow addressed to the memory NI. And the difference in the number of virtual channels used between the router R4 and the router R8 on the receiving end becomes "1" for the traffic flow addressed to the memory M0 but becomes "0" for the traffic flow addressed to the memory M1.

Next, in Step S1804 shown in FIG. 15, the output channel choosing section 812 determines whether or not there is any traffic flow in which the difference in the number of virtual channels used is equal to or greater than zero. That is to say, the output channel choosing section 812 determines whether or not there is any traffic flow in which the number of virtual channels used in its own router is equal to or greater than in an adjacent router on the next stage. If the answer is YES, the process advances to Step S1805. Otherwise, this processing step S1804 is performed all over again.

In the example shown in FIGS. 16A, 16B and 17, as for the router R0, the traffic flow T0 addressed to the memory M1 satisfies ΔR0≥0, and the process advances to Step S1805. As for the router R4, on the other hand, each of the traffic flows T0 and T1 addressed to the memories M0 and M1 satisfies ΔR4≥0, and the process advances to Step S1805.

In the next processing step S1805, the virtual channel choosing section 813 chooses one of the virtual channels in which stored are packets addressed to the destination where the differential value in the number of virtual channels used is equal to or greater than zero and is maximum and to which no output channel has been allocated yet.

In the example shown in FIGS. 16A, 16B and 17, as for the router R0, since the differential value ΔR0 with respect to the traffic flow T0 addressed to the memory M0 is −1, no virtual channels used by the traffic flow T0 are chosen. On the other hand, since the differential value ΔR0 with respect to the traffic flow T1 addressed to the memory M1 is 0, Virtual Channel #3 that stores the traffic flow T1 is chosen.

As for the router R4, the differential value ΔR4 with respect to the traffic flow T0 is 1 and the differential value ΔR4 with respect to the traffic flow T1 is 0. Since both of these differential values are equal to or greater than zero, one of Virtual Channels #0 and #1 that are used by the traffic flow T0 with the larger differential value is chosen if no output channel has been allocated to that virtual channel.

Even though a decision is supposed to be made according to this embodiment depending on whether the difference is equal to or greater than zero, the reference value to make that decision does not have to be zero but may also be equal to or greater than a predetermined threshold value. Optionally, a similar decision may also be made based on the ratio, not the difference, of the number of channels used in the next router to that of channels used in its own router.

For example, the output channels may be allocated if the quotient obtained by dividing the number of virtual channels used in the next router by that of virtual channels used in its own router is equal to or greater than one.

Also, in a situation where the number of virtual channels provided for each router is limited to two in order to cut down the area occupied by circuits in the router, the decision can also be made by seeing if any virtual channel is ever used in the next router, instead of counting how many virtual channels are used there, to avoid using every virtual channel in the next router. Even so, since at least one virtual channel is supposed to be used in its own router, it can be determined whether or not to output the data by comparing how virtual channels are used in its own router to how virtual channels are used in the adjacent router.

Subsequently, in Step S1806 shown in FIG. 15, the output channel choosing section 812 allocates an unused output channel 818 to the virtual channel 817 chosen and updates the virtual channel information 901.

By performing these processing steps S1801 through S1806, allocation of output channels to virtual channels can get done. After that, the process advances to the processing step S1112 shown in FIG. 8.

Hereinafter, it will be described how to determine an exclusive connection between input and output ports in Step S1112.

FIG. 18 shows the procedure of turning the crossbar switch 803 that connects exclusively a virtual channel 817 to respective output ports 805.

First, in Step S2101, the virtual channel choosing section 813 chooses, as a candidate to which a flit is sent on an input port (801) basis, one virtual channel 817 to which an output port 805 and an output channel 818 have both been allocated. If there are multiple virtual channels 817, to each of which an output port 805 and an output channel 818 have both been allocated, one of those virtual channels 817 may be chosen by any method.

Next, in Step S2102, the switch turning section 814 determines whether or not any contention for the same output port 805 that has been set has arisen between the virtual channels 817 that have been chosen by the virtual channel choosing section 813. For example, if the virtual channels associated with Input Ports #0 and #1 are both going to use the same output port, contention arises between them. If the answer is YES, the process advances to Step S2103. Otherwise, the process advances to Step S2104.

If any contention has arisen, then the switch turning section 814 chooses, in Step S2103, one of the virtual channels 817 that have been chosen by the virtual channel choosing section 813 and that are contending with each other for the same output port 818. In this case, the virtual channel may be chosen by any method. For example, it may be chosen by the round robin method. Or if some piece of information about the priority or the time (such as the permissible arrival time of the packet) is described in the packet, then the channel may also be chosen by reference to that information.

Next, in Step S2104, the switch turning section 814 turns the crossbar switch 803 so that the virtual channel 817 that has been chosen in Steps S2101 to S2103 is connected to the output port 805 that has been set, and then sends the flit in the virtual channel 817.

As can be seen, the router of this embodiment can allocate virtual channels on a packet destination address basis so that the numbers of virtual channels used at respective routers on the transmission path become as uniform as possible. Thus, it is possible to prevent a packet with a particular destination from occupying virtual channels at respective routers on the route. As a result, it is possible to avoid an unwanted situation where a packet that should be sent to another destination cannot be sent and the time delay can be reduced and the overall transfer performance (including the throughput) can be improved.

In the embodiment described above, the router 800b compares the number of virtual channels used only with the adjacent router 800c on the next stage. However, this is only an example of the present disclosure. Alternatively, the comparison may also be made with only the adjacent router 800a on the previous stage. Still alternatively, the comparison may also be made with both of the two adjacent routers 800a and 800c.

For example, if the number of virtual channels used is compared to that of the adjacent router 800a on the previous stage, similar processing may be carried out on a traffic flow destination basis based on the difference to be obtained by subtracting the number of virtual channels used in its own router 800b from that of the adjacent router 800a. In that case, the output channel 818 may be allocated preferentially to a traffic flow, of which the difference is equal to or greater than a predetermined threshold value and is maximum.

Still alternatively, similar processing may also be carried out based on the sum of the difference obtained by subtracting the number of virtual channels used in its own router 800b from that of the router 800a on the previous stage and the difference obtained by subtracting the number of virtual channels used in the router 800c on the next stage from that of its own router 800b. In that case, the output channel 818 may be allocated preferentially to a traffic flow, of which the sum is equal to or greater than a predetermined threshold value and is maximum.

In the embodiment described above, each router 800 is supposed to have an output buffer 804. However, the output buffer 804 may be omitted to cut down the memory size. If no output buffers 804 are provided, then the arbiter 850 may be configured to determine association between a virtual channel in the input buffer of its own router and a virtual channel in an input buffer of a router on the next stage.

Embodiment 2

Hereinafter, a second embodiment of the present disclosure will be described.

The router of this embodiment has quite the same components as the counterpart of the first embodiment described above except that the number of virtual channels used comparing section 811 performs its processing differently. Thus, the following description of this embodiment will be focused on only that difference from the first embodiment and their common features will not be described all over again to avoid redundancies.

According to the first embodiment described above, traffic flows are distinguished by their destination and the number of virtual channels used in respective routers on the transmission path can be made uniform on a traffic flow basis. As a result, it is possible to avoid an unwanted situation where every virtual channel in a particular router on the transmission path is occupied by a particular traffic flow to prevent a traffic flow with any other destination from being transferred.

On the other hand, the router of this embodiment can relay multiple traffic flows with mutually different destinations with the bias in the number of virtual channels used between the traffic flows, which may arise in the router due to a difference in transfer rate or packet arrival time, ironed out.

First of all, the problem to deal with in this embodiment will be described with reference to FIGS. 19A, 19B and 20.

Figures 19A, 19B:
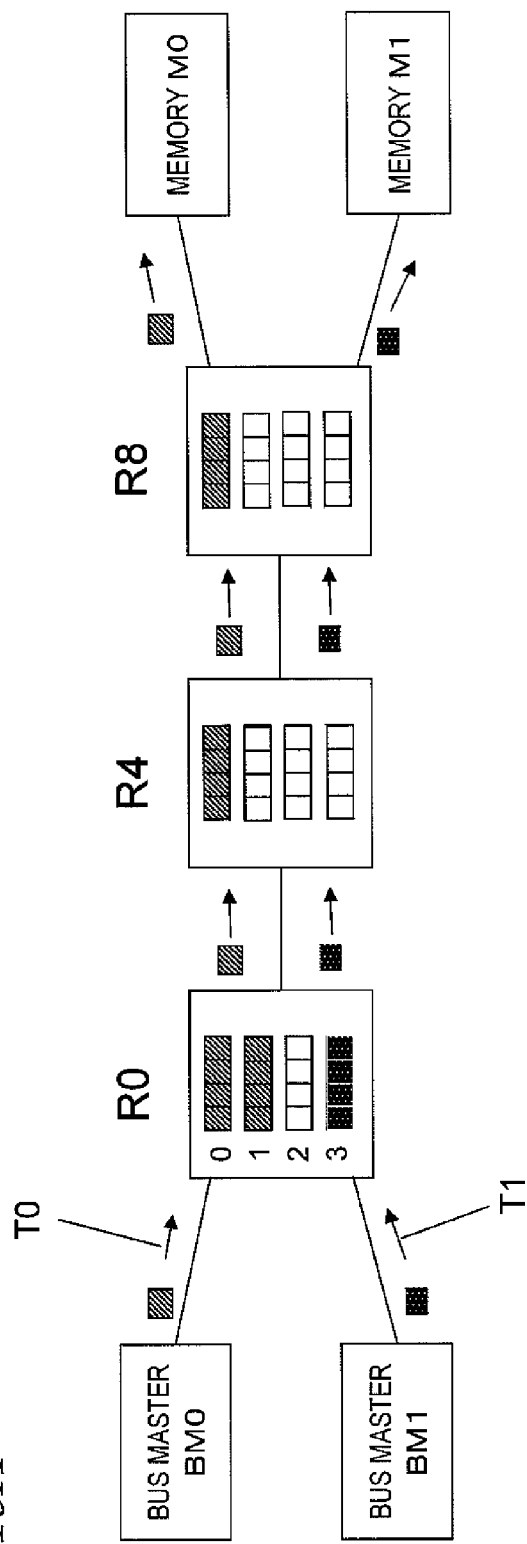
FIGS. 19A and 19B show how a router according to a second embodiment operates.

FIGS. 19A and 19B illustrates what problem may arise in the same configuration as what is shown in FIGS. 16A and 16B. Specifically, FIG. 19A illustrates how respective virtual channels are used at a certain point in time while traffic flows are being transferred from two bus masters BM0 and BM1 to two memories M0 and M1 via routers R0, R4 and R8. And FIG. 19B shows the contents of the virtual channel information in the router R0 at that point in time.

FIG. 20 shows how many virtual channels are used by the traffic flows T0 and T1 addressed to the memories M0 and M1 in each of the routers R0, R4 and R8 shown in FIG. 19A and what is the difference in the number of virtual channels used between that router and the adjacent router on the next stage.

As shown in FIG. 19A, in the router RD, the traffic flow T0 addressed to the memory M0 uses two virtual channels and the traffic flow T1 addressed to the memory M1 one virtual channel. In the router R4, the traffic flow T0 uses one virtual channel but the traffic flow T1 does not use any virtual channel. Likewise, in the router R8, the traffic flow T0 uses one virtual channel but the traffic flow T1 does not use any virtual channel. Thus, the difference $\Delta R0$ in the number of virtual channels used between the router R0 and the adjacent router R4 on the receiving end becomes "1" for both of the traffic flows T0 and T1. On the other hand, the difference $\Delta R1$ in the number of virtual channels used between the router R1 and the adjacent router R8 on the receiving end becomes "0" for both of the traffic flows T0 and T1.

If the virtual channels of the routers R0, R4 and R8 are used as shown in FIGS. 19A and 19B, the difference in the number of virtual channels used between the routers R0 and R4 becomes "1" for both of the traffic flows T0 and T1 as shown in FIG. 20.

That is why if the routers of the first embodiment are used, virtual channels could be allocated to both of these two traffic flows T0 and T1 addressed to the memories M0 and M1.

In this case, if either an output channel or a virtual channel of the router R4 is allocated to Virtual Channel #1 of the router R0, then the traffic flow T0 uses two virtual channels of the router R4 but the traffic flow T1 cannot use any virtual channel. As a result, a bias in the number of virtual channels used is produced between the traffic flows T0 and T1 with mutually different destinations. Consequently, in the traffic flow T1 addressed to the memory M1, to which no virtual channels have been allocated, the quality of transfer (or throughput) declines and the propagation delay increases.

According to this embodiment, if there are multiple traffic flows, of which the differences in the number of virtual channels used between its own router and the adjacent router are equal to each other, then an output channel 818 is allocated preferentially to one of the traffic flows that uses a relatively small number of virtual channels in the adjacent router. As a result, it is possible to avoid producing such a bias in the number of virtual channels used between multiple traffic flows that are going to different destinations via the same router.

Hereinafter, the procedure of processing of this embodiment will be described.

Figure 21:
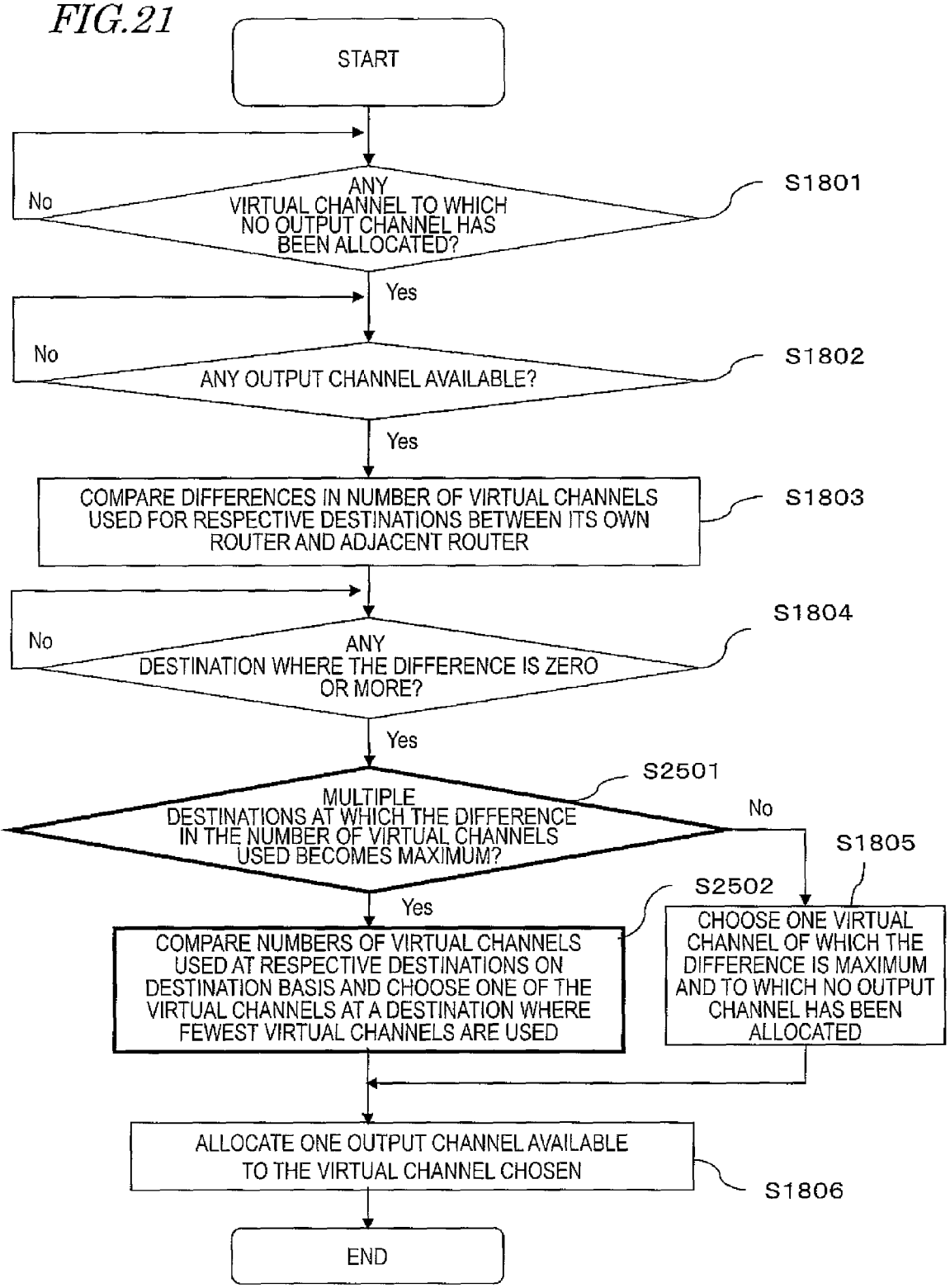
FIG. 21 is a flowchart showing a procedure in which the router of the second embodiment allocates channels.

FIG. 21 is a flowchart showing how the output channel choosing section 812 operates in the router 800 of this second embodiment. In FIG. 21, the same processing step as the one shown in FIG. 15 is identified by the same reference numeral. The following description of this embodiment will be focused on only the difference from the processing shown in FIG. 15.

If it has turned out in Step S1804 that there is a destination, of which that difference is equal to or greater than zero, the output channel choosing section 815 compares, in the next processing step S2501, the number of virtual channels used in its own router 800b to that of virtual channels used in the adjacent router and determines whether or not there are multiple destinations at which that difference becomes maximum. If the answer is YES, the process advances to Step S2502. Otherwise (i.e., if there is only one destination at which the difference becomes maximum (equal to or greater than zero)), the process advances to Step S1805.

For example, if the answer to the query of the processing step S2502 is YES with respect to the router R0 in the configuration shown in FIG. 19A, both of the traffic flows T0 and T1 have the same differential value ΔR0 as shown in FIG. 20, and therefore, the process advances to Step S2502.

In Step S2502, the number of virtual channels used comparing section 811 refers to the adjacent channel availability information management section 810 to choose one virtual channel 817 that is used by one of the traffic flows that have turned out to have the maximum difference if the number of output channels 818 used at the router on the next stage is the smallest at the destination of that traffic flow. And the number of virtual channels used comparing section 811 allocates the output channel 818 to that virtual channel 817. As a result, the numbers of virtual channels used can be made more uniform between the respective traffic flows.

For instance, in the example shown in FIG. 20, the differential value ΔR0 is one for both of the traffic flows T0 and T1 but the number of virtual channels used in the next router R4 is one for the traffic flow T0 and zero for the traffic flow T1. That is why Virtual Channel #3 to store the flits of the traffic flow T1 (see FIGS. 19A and B) is chosen.

In this manner, if there are multiple traffic flows, of which the differences in the number of virtual channels used between its own router and the adjacent router are equal to each other, then an output channel is allocated preferentially to one of the traffic flows that uses a relatively small number of virtual channels in the adjacent router. As a result, the numbers of virtual channels used can be made more uniform between multiple traffic flows with mutually different destinations.

Generally speaking, if a traffic flow with a high transfer rate is relayed or if a packet addressed to a particular destination needs to be relayed in a short time, those traffic flows are likely to occupy more virtual channels in the router. Then, a traffic flow with a low transfer rate or a traffic flow that has arrived late with a delay could not use virtual channels right away in some cases.

In contrast, the router of this second embodiment controls the output so that the number of virtual channels used in the adjacent router at the destination becomes as uniform as possible, no matter to what destination the traffic flow needs to be transferred. Consequently, the transfer performance (in terms of throughput and time delay) can be made more uniform between multiple traffic flows with different destinations irrespective of the difference in transfer rate or packet arrival time while preventing any particular traffic flow from occupying virtual channels.

Embodiment 3

Hereinafter, a third embodiment of the present disclosure will be described.

According to the first and second embodiments described above, traffic flows are distinguished by their destinations and allocation of virtual channels is controlled so that the numbers of virtual channels used become as uniform as possible among respective routers on the transmission path. As a result, it is possible to prevent a traffic flow headed to any particular destination from occupying every virtual channel in the router and causing a decline in transfer performance.

According to this embodiment, a number of packets with the same destination specified, which are saved in multiple virtual channels in a router, have their order of transmission controlled by reference to the time information added to those packets. In this manner, each traffic flow can be transferred with its quality concerning the time delay improved.

Generally speaking, the maximum amount of time allowed a packet that a bus master has sent to arrive at a receiving node (i.e., the permissible time delay) will vary according to the type of the given application or the content of processing to carry out. For that reason, it is necessary to not just prevent a traffic flow with any particular destination from occupying every virtual channel of any router on the transmission path but also allocate a virtual channel preferentially to a packet to which only a short amount of time is allowed. Otherwise, the packet would be unable to arrive within the specified amount of time and the system could not operate properly.

The router of this embodiment gives a higher priority to sending packets to which a shorter time is allowed than sending packets to which a longer time is allowed in a traffic flow to be delivered to the same destination. In this manner, a larger number of packets can be sent to the receiving node within the specified amount of time.

Hereinafter, the configuration and operation of the router 800b of this embodiment will be described. The same components or operations as their counterparts of the first and second embodiments will not be described all over again.

Figure 22:
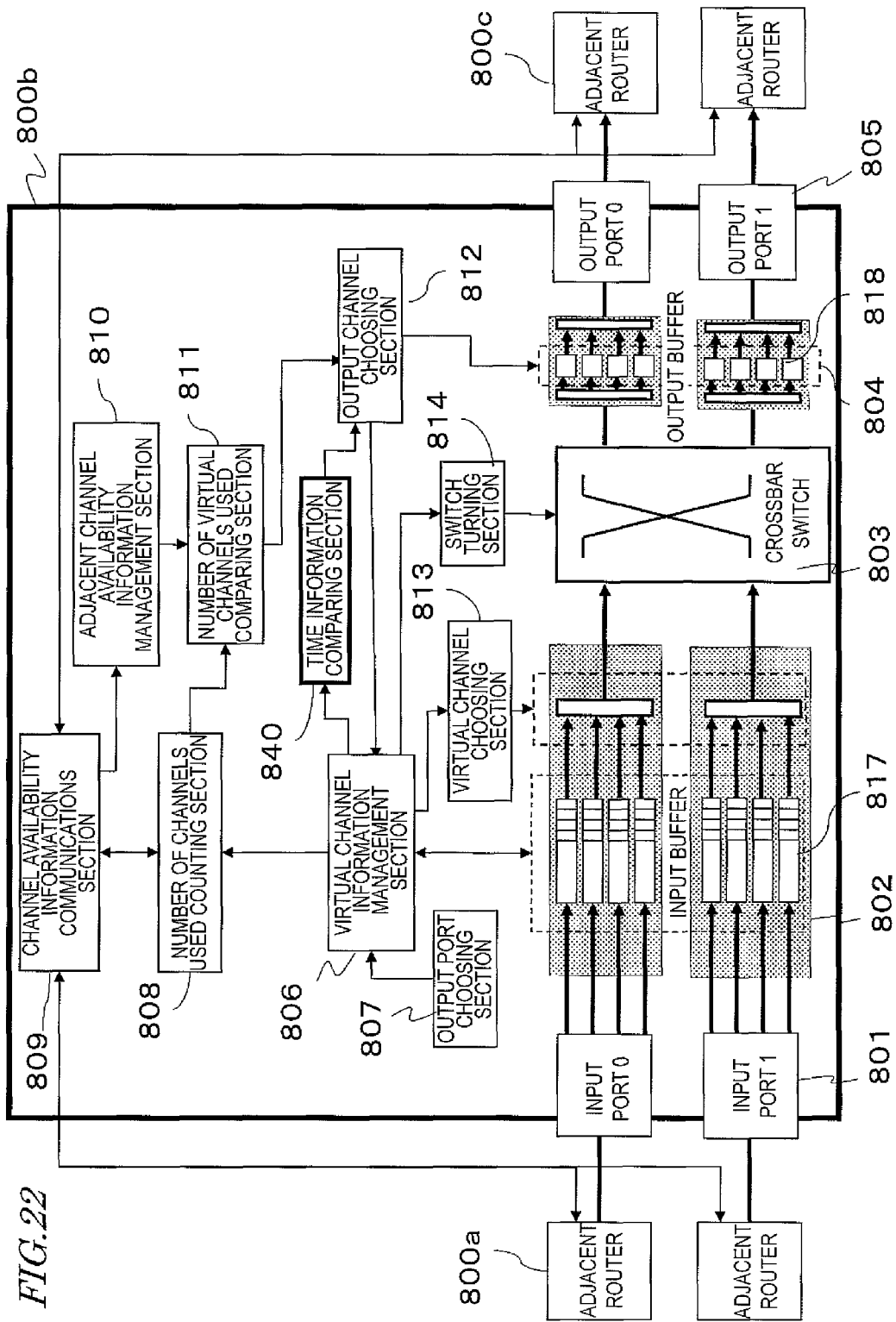
FIG. 22 illustrates a configuration for a router according to a third embodiment.
Figure 23:
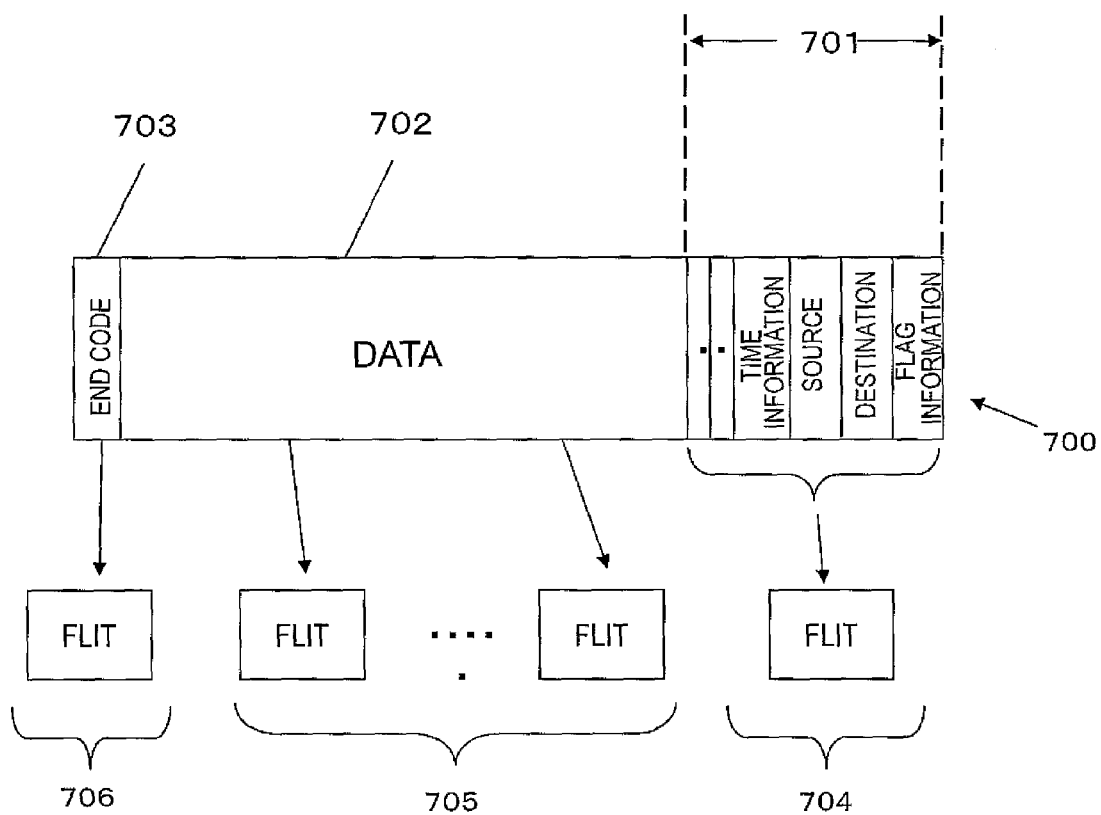
FIG. 23 shows what fields a packet may be made up of according to the third embodiment.

FIG. 22 illustrates a configuration for a router according to this embodiment. FIG. 23 shows the data structure of a packet to be sent in this embodiment. In FIGS. 22 and 23, any component having substantially the same function as its counterpart of the first and second embodiments is identified by the same reference numeral as the one used in the foregoing description.

The router 800b of this embodiment further includes a time information comparing section 840 which compares the time information of multiple flits that are stored in a plurality of virtual channels 817 to each other by reference to the virtual channel information that is managed by the virtual channel information management section 806.

According to this embodiment, to the header flit 704 of a packet 700 to send, added are pieces of time information, including a packet transmitting time and the specified amount of time allowed a packet to arrive at a receiving node, which are used to determine the order of transmission of packets, as shown in FIG. 23. The virtual channel information management section 806 of this embodiment adds this time information, as well as other pieces of information, to the virtual channel information.

FIG. 24 shows an example of virtual channel information 2701 according to this embodiment. In the virtual channel information 2701, managed is the time information described in the header flit 704 of a packet that is stored in each virtual channel. In the example to be described below, the maximum amount of time allowed a packet to arrive at a receiving node is supposed to be used as a piece of time information.

Figure 25:
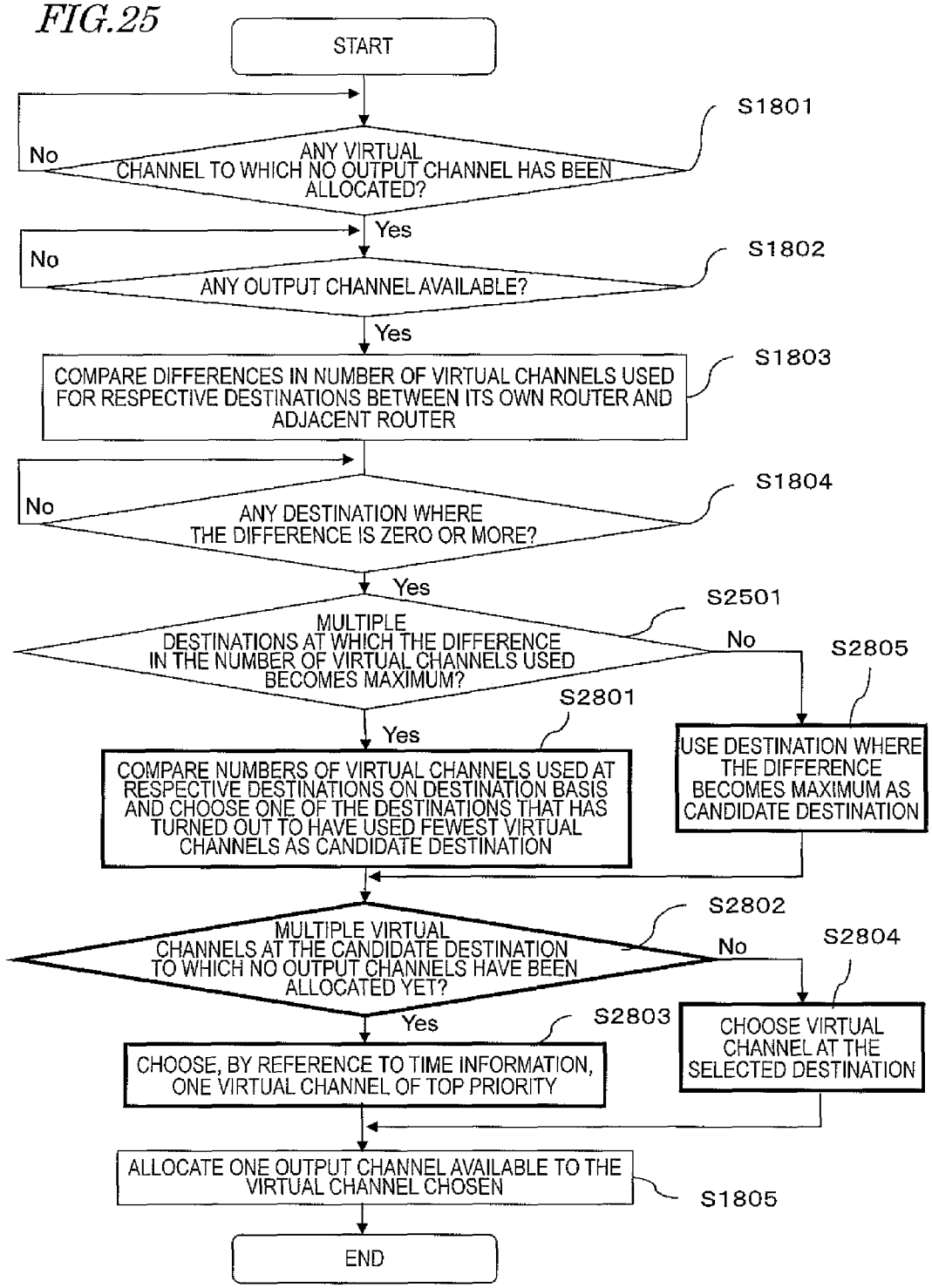
FIG. 25 is a flowchart showing a procedure in which the router of the third embodiment allocates channels.

FIG. 25 is a flowchart showing the procedure in which the router 800b of this embodiment performs the operation of allocating virtual channels 817 and output channels 818. In FIG. 25, the same processing step as its counterpart of the first and second embodiments described above is identified by the same reference numeral.

In this embodiment, the same processing steps as their counterparts of the second embodiment are performed before the processing step S2501 is carried out. If it has turned out in Step S2501 that there are multiple destinations for which the difference in the number of virtual channels used becomes maximum, the process advances to Step S2801.

In Step S2801, the output channel choosing section 812 compares the numbers of virtual channels used in the adjacent router 800c at the respective destinations on a traffic flow destination basis and chooses one of the destinations that has turned out to have used the smallest number of virtual channels as a candidate destination. Meanwhile, in Step S805, the destination that has turned out in Step S2501 to have used the largest number of virtual channels is regarded as a candidate destination.

Figures 26A, 26B:
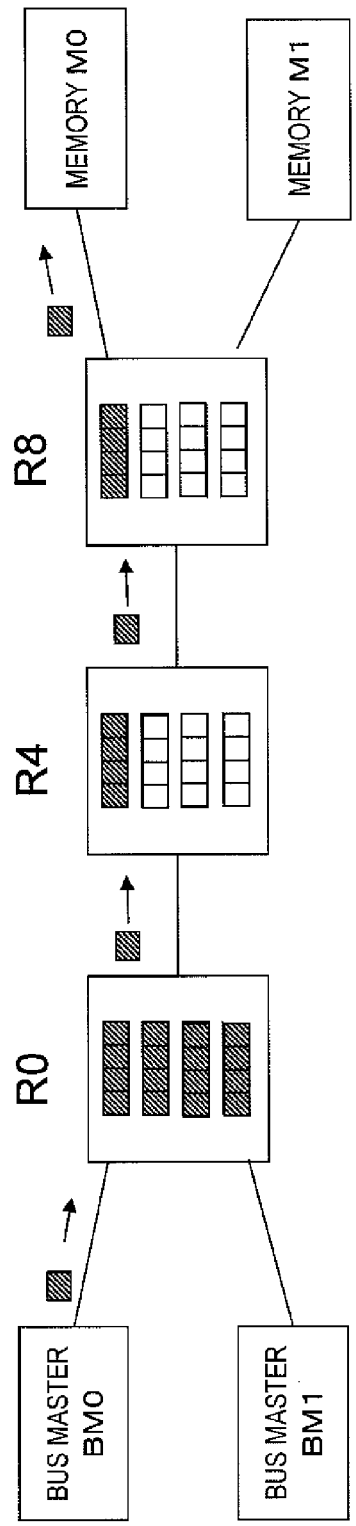
FIGS. 26A and 26B show how the router of the third embodiment operates.

FIGS. 26A and 26B illustrate how virtual channels may be used in respective routers in the same configuration as what is shown in FIGS. 19A and 19B. Specifically, FIG. 26A illustrates how respective virtual channels are used at a certain point in time while a traffic flow is being transferred from a bus master BM0 to a memory M0 via routers R0, R4 and R8. And FIG. 26B shows the contents of the virtual channel information in the router R0 at that point in time. In this example, each of the routers R0, R4 and R8 is also supposed to have four virtual channels. In FIGS. 26A and 26B, association of those virtual channels with input ports will not be considered for the sake of simplicity. Also, in FIG. 26A, in the traffic flow transferred from the bus master BM0 to the memory M0, the virtual channels are supposed to be sequentially allocated from top to bottom on the paper. It should be noted that the method shown in FIG. 26A is just an exemplary method for allocating virtual channels and any of various other methods for allocating virtual channels on a packet by packet basis may also be adopted as well.

In the example illustrated in FIGS. 26A and 26B, a packet to be delivered to the memory M0 is stored in every virtual channel of the router R0. That is why in Step S2801, the memory M0 is chosen as a candidate destination.

Once the candidate destination has been chosen, the output channel choosing section 812 determines, in the next processing step S2802, whether or not there are multiple virtual channels 817 in which that packet, of which the destination has been specified, is stored. If the answer is YES, the process advances to Step S2803. Otherwise, the process advances to Step S2804.

In the example illustrated in FIGS. 26A and 26B, as the router R0 has multiple virtual channels in which the packet to be delivered to the memory M0 that has been chosen in Step S2801 is stored, the process advances to Step S2803.

In Step S2803, the time information comparing section 840 refers to the "time information" that is included in the virtual channel information 2701 and chooses one of multiple virtual channels stored in the packet to be delivered to the destination that has been chosen in Step S2801 if the virtual channel turns out to have the highest degree of priority by reference to the time information.

In the example illustrated in FIGS. 26A and 26B, if the processing step S2803 is to be performed on the router R0, then the time information comparing section 2601 compares the pieces of time information of Virtual Channels #1, #2 and #3, to which no output channels have been allocated yet, to each other. In this example, if a packet is allowed the shortest amount of time to arrive at the receiving node, then a top priority is supposed to be given to sending that packet. As a result, virtual Channel #2, to which no output channel has been allocated yet and to which the shortest amount of time is allowed, is chosen.

On the other hand, if it has turned out in Step S2802 that the candidate destination is only one virtual channel, to which no output channel has been allocated yet, the output channel choosing section 812 chooses that virtual channel in Step S2804.

Once a virtual channel in which the packet to send is stored has been chosen in the processing step S2802 or S2803, the output channel choosing section 812 allocates, in Step S1805, an output channel 818 available to the virtual channel chosen.

Hereinafter, an example of the time information according to this embodiment will be described.

In the example described above, the time information comparing section 840 allocates an output channel 818 preferentially to a packet that is allowed the shortest amount of time to arrive at the destination earlier than anything else. However, the order of allocating output channels may also be determined by reference to any kind of time information other than the amount of time allowed a packet to arrive at the destination.

Figure 27:
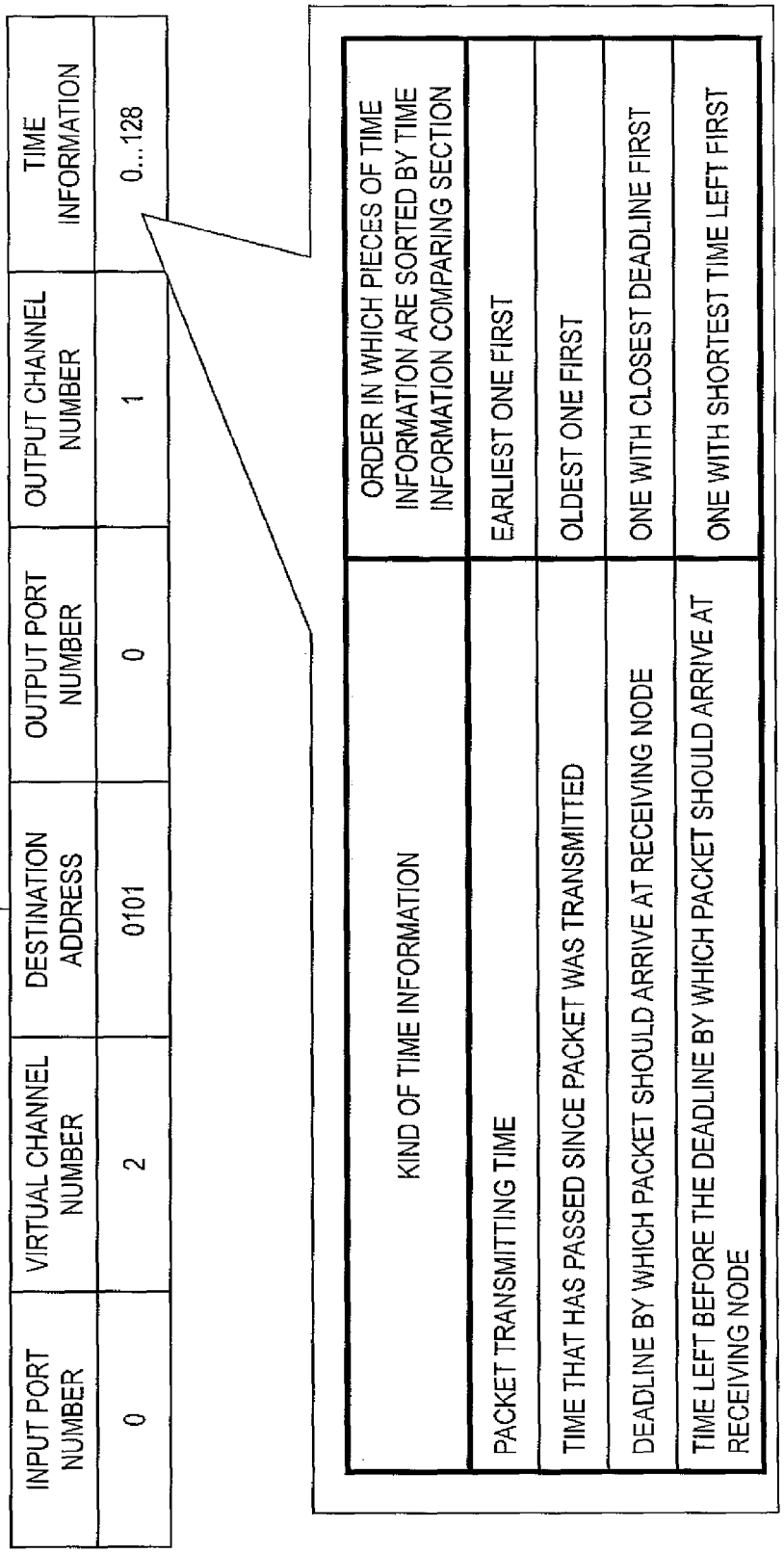
FIG. 27 shows examples of timing information according to the third embodiment.

FIG. 27 shows examples of the time information that may be used in this embodiment and also shows in what order those pieces of time information may be compared to each other and sorted. For example, by using the times when packets were transmitted as pieces of time information, output channels may be allocated sequentially to those packets so that a packet with the earliest transmitting time is given an output channel first. In this manner, the packets can be relayed to the receiving node with their order of transmission maintained among them. Alternatively, the amounts of time that have passed since the packets were transmitted may also be used as pieces of time information instead of their transmitting times and output channels may be allocated sequentially to those packets so that an output channel is allocated first to a packet that was transmitted the longest time ago.

If the transmitting times are managed, each piece of time information needs to have a number of digits that is large enough to represent the operating period of a semiconductor system. That is why if a semiconductor system operates for a long time, then the time information needs to have a large number of digits. On the other hand, if the amount of time that has passed since a packet was transmitted is used as a piece of time information, the number of digits of the time information just needs to be large enough to represent the amount of time it takes for a packet that has been transmitted to be received. As a result, the time information may have a relatively small number of digits, which is beneficial. And if a value to be handled as a piece of time information has a small number of digits, the time information comparator may have a smaller size in the time information comparing section 840. As a result, the resources to establish the semiconductor system can be cut down effectively.

Also, even if the transmitting times are used as pieces of time information, the number of digits to be handled as the time information can still be reduced by using only the smallest n digits of each transmitting time. The n digit value may need to be large enough to represent the time it takes for a packet transmitted to be received, for example.

Alternatively, by using the deadline by which a packet should arrive at the receiving node as another exemplary piece of time information, output channels may be allocated sequentially to those packets so that a packet with the earliest deadline is given an output channel first. Still alternatively, by using the amount of time left before the deadline by which a packet should be delivered to the receiving node as in the example described above, output channels may also be allocated sequentially to the packets so that a packet with the shortest time left is given an output channel first.

As can be seen, the router of this embodiment can transfer traffic flows to mutually different destinations with the bias in the number of virtual channels used reduced among respective routers on the transmission path and with the quality of the traffic flows transferred maintained. That is why even if a traffic flow of a best effort type, of which the deadline is still a long way off, and a traffic flow of a quality guaranteed type, of which the deadline is only a short way off, need to be transferred in the same mix, the quality can be improved with respect to the transmitting times. Specifically, by giving a higher priority to transferring such a traffic flow of the quality guaranteed type, the traffic flow of the quality guaranteed type can be delivered to the receiving node within the specified amount of time. Meanwhile, as for the traffic flow of the best effort type, packets can be distributed and stored in the virtual channels of multiple routers over the transmission path. As a result, it is possible to prevent any particular traffic flow from occupying every virtual channel of any router. Consequently, even if a traffic flow of the quality guaranteed type has been transmitted afterward, that traffic flow can also be transferred right away without waiting for virtual channels to be vacated on the route.

Consequently, the router of this embodiment can use virtual channels in an NoC effectively enough while controlling the flow rates of multiple different types of traffic flows, which require multiple different levels of quality, according to their request levels.

Embodiment 4

Hereinafter, a fourth embodiment of the present disclosure will be described.

The router of the first, second and third embodiments described above makes the numbers of virtual channels used as uniform as possible among respective routers on the transmission path with respect to each of multiple traffic flows with different destinations, thereby preventing any particular traffic flow from occupying every virtual channel in any router on the transmission path.

On the other hand, if the number of virtual channels used by a particular traffic flow has exceeded a predetermined threshold value in any router on the transmission path, the router of this embodiment controls and regulates the flow between the router and the bus master, thereby regulating the rate of the traffic flow coming from the bus master. As a result, it is possible to avoid an unwanted situation where every virtual channel on the transmission path is occupied.

"To regulate the rate of the traffic flow" may include (a) decreasing the transfer rate of the traffic flow, (b) stopping transferring the traffic flow altogether, and (c) setting either the upper and lower limits or only the upper limit to the transfer rate of the traffic flow and transferring the traffic flow only within that range that has been set.

First of all, the problem to deal with in this embodiment will be described with reference to FIGS. 28A and 28B.

Figure 28A:
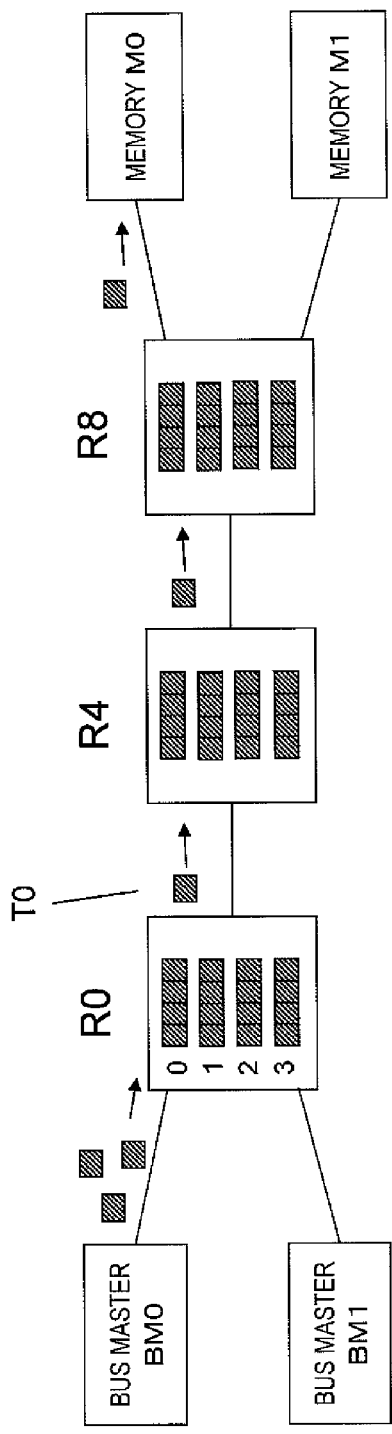
FIGS. 28A and 28B show how virtual channels may be used in the router of the fourth embodiment.

FIG. 28A illustrates a situation where a traffic flow T0 is being transferred from a bus master BM0 to a memory M0 via routers R0, R4 and R8. If the transfer rate of the traffic flow T0 being transferred from the router R8 to the memory M0 is lower than that of the traffic flow T0 being transferred from the bus master BM0 to the router R0 and if such a situation persists for a long time, only the control for making the numbers of virtual channels used uniform among the routers on the transmission path will soon establish a "uniform" state in which every virtual channel in every router on the transmission path is used by the same traffic flow T0. In that case, the traffic flow can no longer be transferred to any other destination.

Figure 28B:
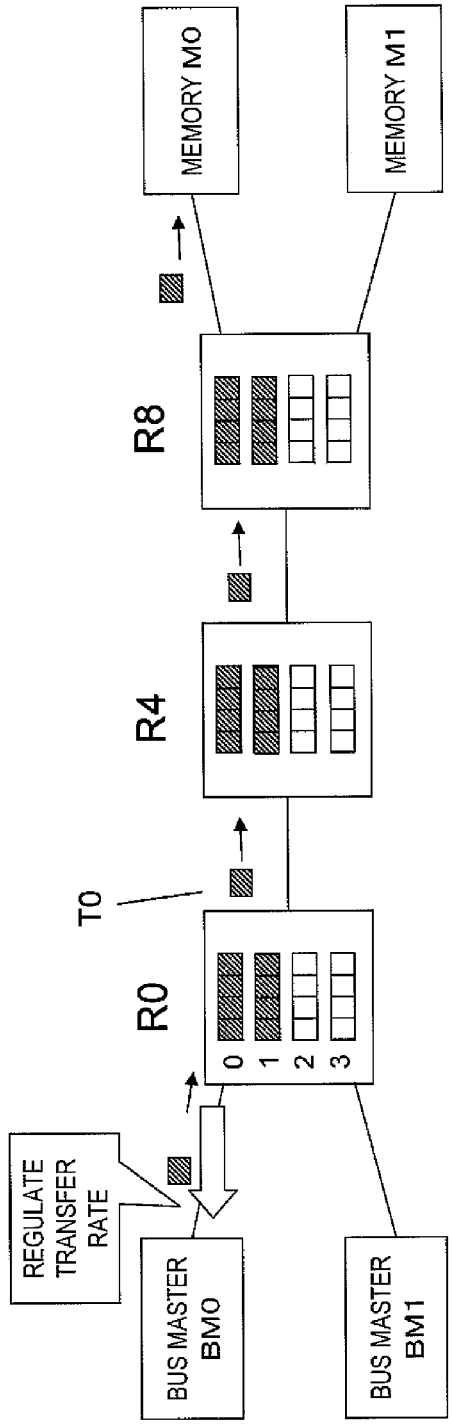

That is why according to this embodiment, as shown in FIG. 28B, if the number of virtual channels used by the traffic flow T0 is larger than the predetermined threshold value at the router R0 that is directly connected to the bus master BM0, then a control for regulating the traffic flow T0 between the router R0 and the bus master BM0 is carried out. By performing that control, it is possible to prevent the traffic flow T0 from occupying every virtual channel in every router on the transmission path.

Hereinafter, the configuration and operation of the router 800, which is adjacent to the bus master in this embodiment, will be described. The same components or operations as their counterparts of the first embodiment will not be described all over again.

Figure 29:
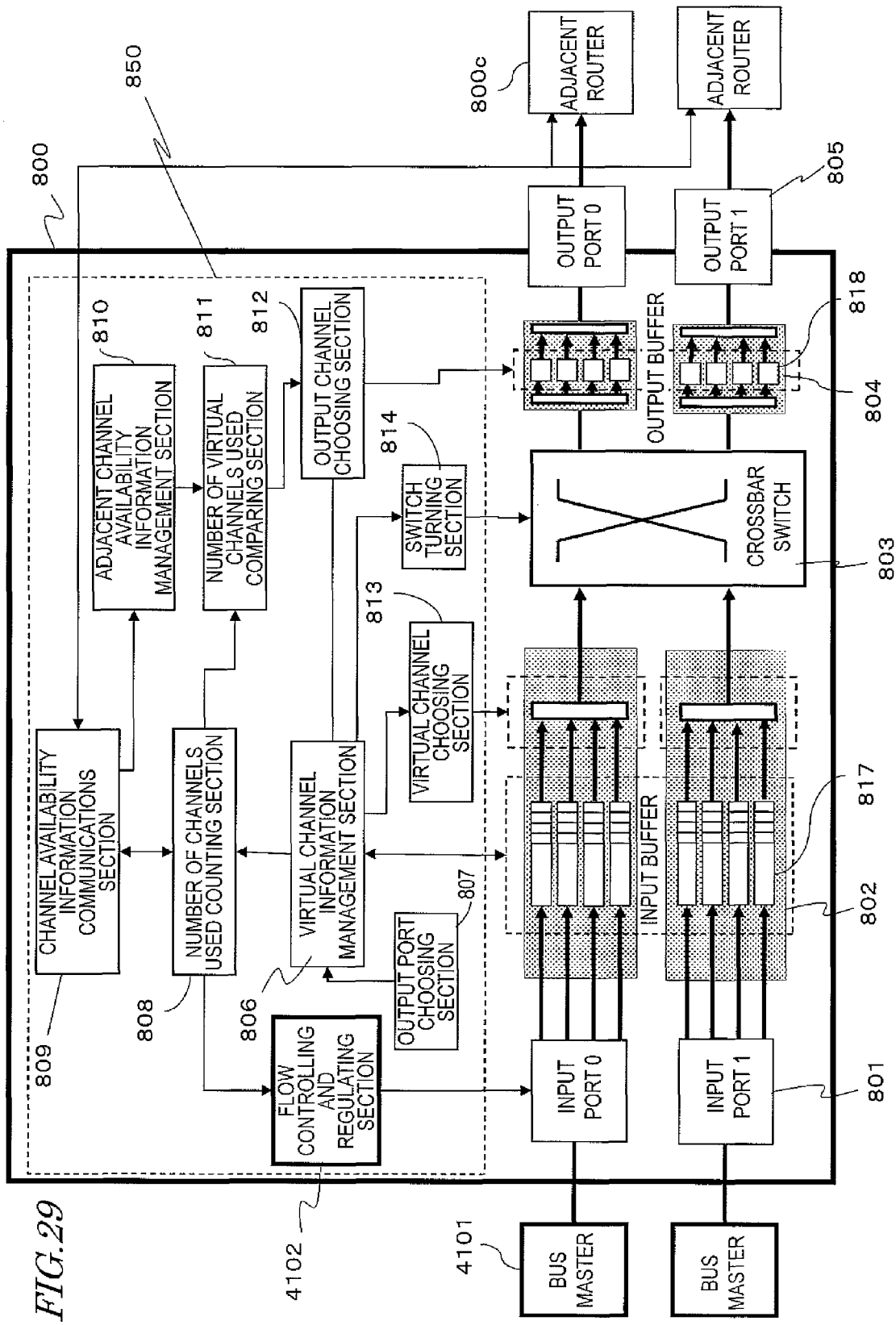
FIG. 29 illustrates a configuration for a router according to a fourth embodiment.

FIG. 29 illustrates a configuration for a router according to this embodiment. The router 800 of this embodiment is directly connected to a bus master 4101. The arbiter 850 includes not only every component of its counterpart of the first embodiment described above but also a flow controlling and regulating section 4102 which regulates the rate of the traffic flow coming from the bus master 4101 as well.

The flow between the bus master 4101 and the router 800 may be controlled in the following manner, for example. When the router 800 returns an acknowledge signal to the bus master 4101 in response to a request to send a packet that has been received from the bus master 4101, the bus master 4101 sends that packet. By adjusting the timing to return the acknowledge signal in response to the send request from the bus master 4101, the flow controlling and regulating section 4102 regulates the rate of transfer from the bus master 4101 to the router 800.

Figure 30:
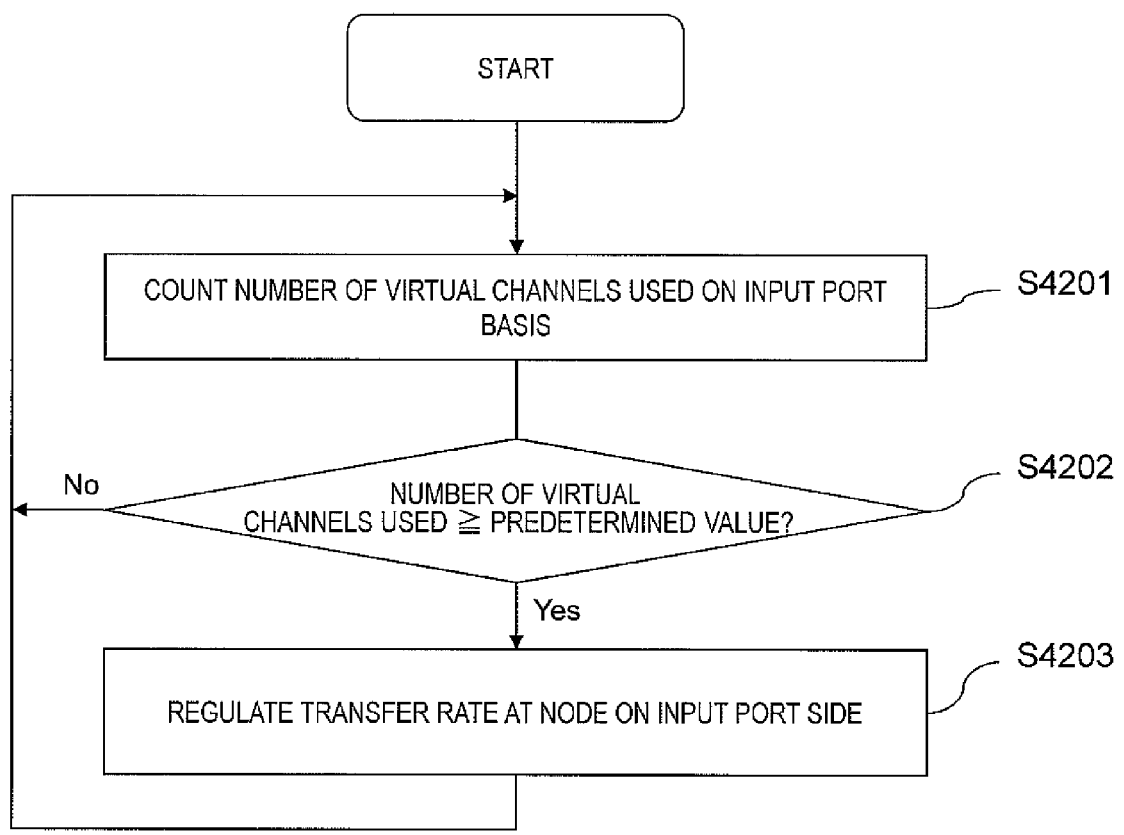
FIG. 30 is a flowchart showing a procedure in which the router of the fourth embodiment allocates channels.

FIG. 30 is a flowchart showing the procedure of the flow control and regulation to be performed by the router 800 of this embodiment on the bus master 4101. First of all, in Step S4201, the router 800 counts the number of virtual channels used on an input port basis. Next, in Step S4202, the flow controlling and regulating section 4102 determines whether or not the number of virtual channels used by a traffic flow to be transferred to a particular destination is larger than a predetermined threshold value. If the answer is NO, the process goes back to the previous processing step S4201. On the other hand, if the answer is YES, the process advances to Step S4203, in which the bus master sending out that traffic flow is instructed to control the transfer rate of that traffic flow, thereby controlling and regulating the flow.

For instance, in the example shown in FIG. 28B, the predetermined threshold value is set to be one. Thus, if the router R0 has sensed that two or more virtual channels are used by the traffic flow T0, the router R0 stops outputting a signal that allows the bus master BM0 to send the traffic flow until the number of virtual channels used becomes less than two, thereby getting the bus master BM0 to stop sending the traffic flow. As a result, as shown in FIG. 28B, it is possible to prevent the traffic flow T0 from occupying every virtual channel on the transmission path while keeping the numbers of virtual channels used uniform among the routers on the transmission path. According to this embodiment, the flow control described above and the control to make the numbers of virtual channels used uniform among adjacent routers according to the first embodiment are performed in combination, thereby achieving more advantageous effects than in a situation where only the flow control is carried out.

Unless the control to make the numbers of virtual channels used by a traffic flow to be transferred to the same destination uniform is performed among the respective routers on the transmission path, even if congestion has occurred at a particular router on the transmission path due to the occupancy of the virtual channels, the router adjacent to the bus master can not sense that congestion right away. That is to say, it is not until that congestion reaches the router that is adjacent to the bus master after having sequentially propagated to the source of the traffic flow that the bus master, sending out that traffic flow, senses the congestion on the transmission path.

On the other hand, if the control to make the numbers of virtual channels used by the traffic flow to be transferred to the same destination uniform is performed among respective routers on the transmission path, then the flow through the routers on the transmission path becomes more uniform. That is why the degree of congestion of the traffic flow can be sensed based on only the channel availability of the router that is connected to the bus master even without checking out the channel availability of each router. As a result, before the virtual channels are occupied at a particular router on the transmission path, the bus master that is sending out the traffic flow can sense the congestion on the transmission path. By performing the control of this embodiment, it is possible to avoid an unwanted situation where every virtual channel of a router on the transmission path is occupied by a particular traffic flow being sent out by the bus master to prevent any other traffic flow from being transferred at all.

It should be noted that the traffic flow to be subjected to that flow control by the flow controlling and regulating section 410 does not have to be transferred to the same destination. But the traffic flow just needs to use at least a part of the transmission path in common. Furthermore, the flow control of this embodiment does not always have to be performed based on the number of channels used at the router that is connected to the bus master but may also be carried out based on the flow rate, the time delay or any other appropriate parameter.

In the fourth embodiment just described, the transfer control of the first embodiment and the flow control are supposed to be combined. However, the same effects will be achieved even when the transfer control of the second or third embodiment and the flow control are carried out in combination.

Other Embodiments

In the first through fourth embodiments described above, traffic flows are supposed to be distinguished by packets' destinations. However, traffic flows can also be distinguished and virtual channels can be allocated by sensing a difference between the packets' sources.

For example, in a situation where traffic flows are transferred from multiple bus masters toward a single destination node, if the traffic flows are distinguished only by packets' destination, a packet that has been sent out from a particular bus master may occupy every virtual channel in a router on the transmission path. In that case, a packet that has been sent out from another bus master cannot be transferred right away.

On the other hand, if traffic flows are distinguished by packets' sources, even traffic flows to be transferred to the same destination can also be distinguished from each other by their sources, and therefore, a control operation can be performed to make the numbers of virtual channels used as uniform as possible among respective routers. As a result, data can be transferred with the quality of transfer from any bus master kept high enough. Optionally, traffic flows may also be distinguished and virtual channels may also be allocated based on combinations of packets' sources and destinations.

Figures 31A, 31B:
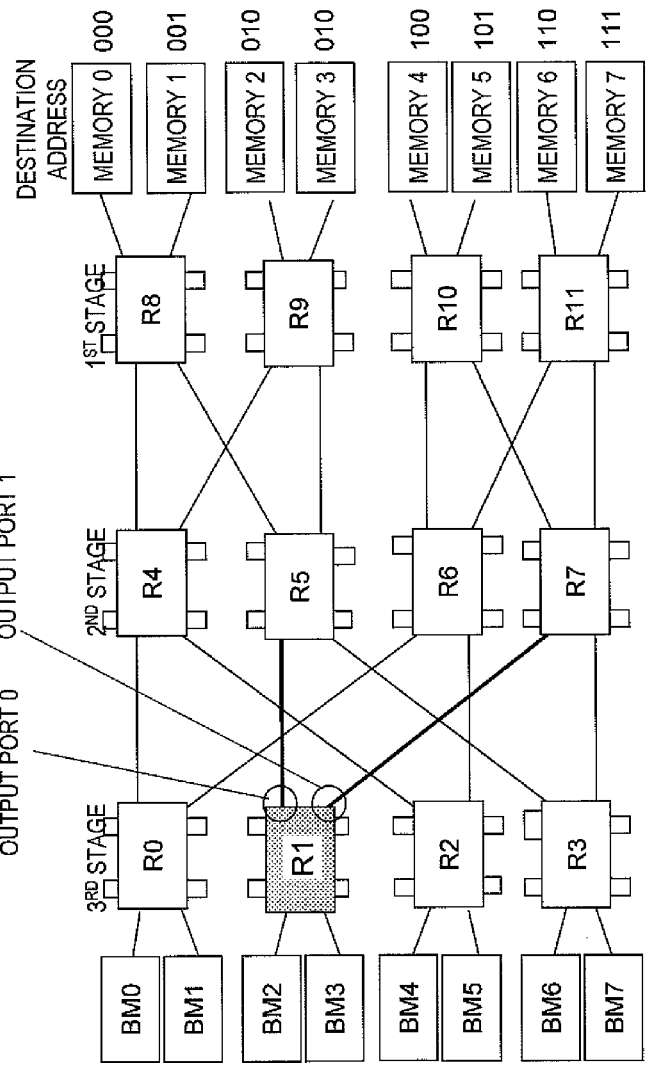
FIGS. 31A and 31B show exemplary definitions of a destination.

In the foregoing description, the terms "destination" and "source" are supposed herein to mean a "node at which a packet arrives finally" and a "node from which that packet has been sent out originally", respectively. However, these terms may also be interpreted in the following manner. Specifically, the "destination" and "source" may also be represented by a piece of information indicating that a particular path needs to be passed through such as another router or input/output port that the packet passes through. FIGS. 31A and 31B show how various destinations as viewed from the router R1 may be defined and specific examples of those destinations. For example, in the configuration shown in FIG. 31A, any router that a packet passes through on its way (i.e., transmission path) toward the receiving node (i.e., memory) may also be called a "destination".

If the "destination" is defined to be a receiving node (or memory) with respect to the router R1 shown in FIG. 31A, then the destination can be any of the eight Memories #0 through #7. Meanwhile, if the "destination" is defined to be the router after the next one, then the destination can be any of four routers R8 through R11. Furthermore, if the "destination" is defined to be the next router, then the destination can be any of two routers R5 and R7.

The destination of a packet does not have to be a node such as a memory or a router but may also be defined by the output port to use. In that case, for the router R1, any of two Output Ports #0 and #1 (i.e., the two routers R5 and R7) can be its destination.

When a packet arrives at a router that is supposed to be its destination, that router may set its own destination according to its definition and may send out that packet toward it.

Although attention is paid to only the destination in the example described above, various sources may be defined with respect to each router by applying the same idea to the sources, too. That is to say, the source does not have to be a bus master on the transmitting end but the previous router, the router before the previous one, or an input port to use may also be defined to be the source.

Figure 32:
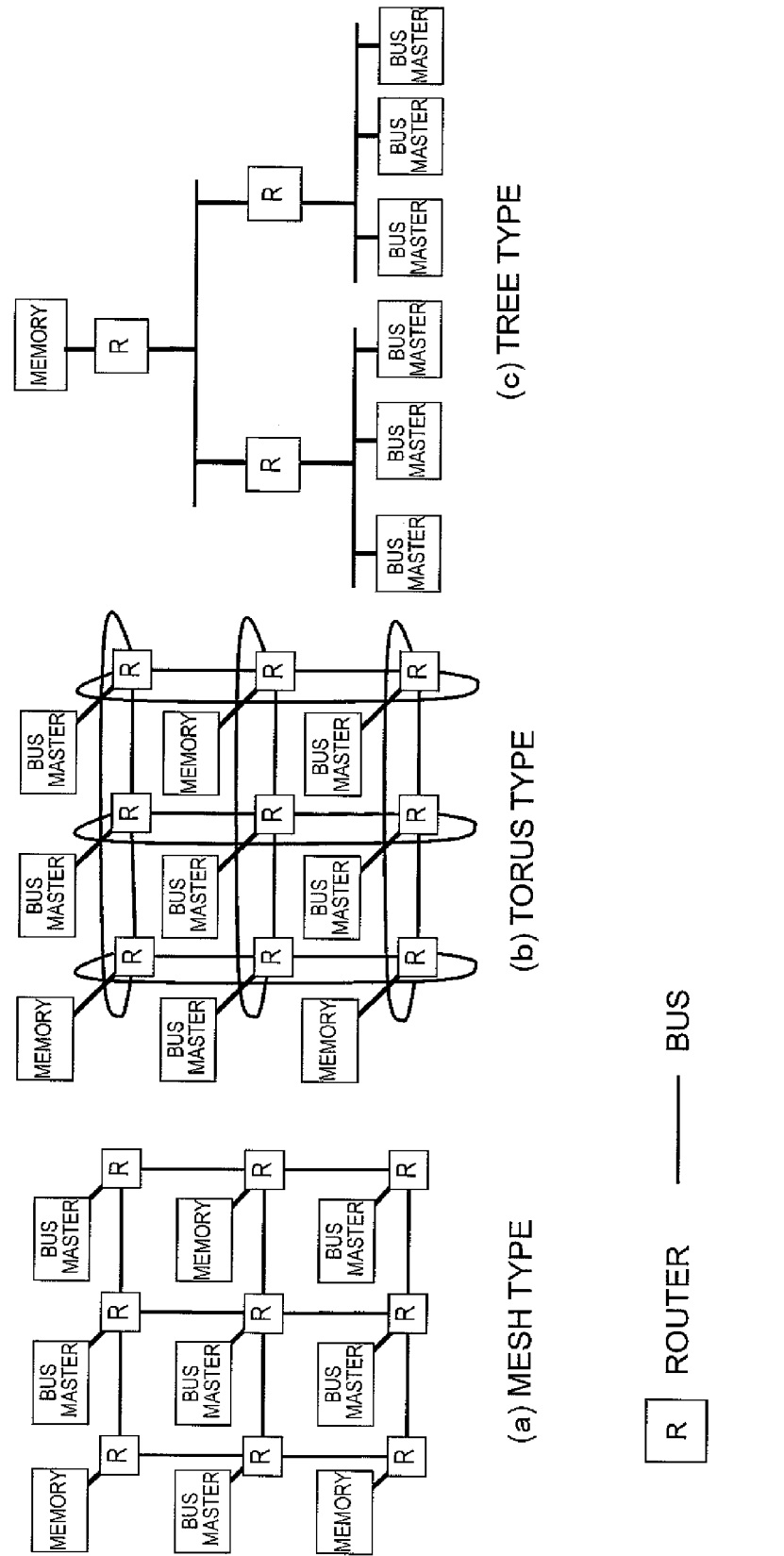
FIG. 32 illustrates examples of network topologies to which the present disclosure is applicable.

Also, in the first through fourth embodiments described above, the topology of the integrated circuit is supposed to be the multistage interconnection network. However, the router of the present disclosure does not always have to be used in such a multistage interconnection network. Alternatively, a mesh-type topology may also be formed by arranging multiple routers as a grid as shown in portion (a) of FIG. 32. Still alternatively, a torus-type topology, in which routers are connected both vertically and horizontally to form a ring shape, may also be adopted as shown in portion (b) of FIG. 32. Furthermore, a hierarchical topology, in which buses are connected together hierarchically, may even be adopted as shown in portion (b) of FIG. 32. Anyway, the router of the present disclosure is applicable in the same way to any topology in which a number of bus masters are connected together through distributed buses.

In the foregoing description, each component of the router is illustrated as a block with its own unique function. However, the operation of this router can also get done even by making a processor (computer) built in the router execute a program that defines the processing to be carried out by those functional blocks. The procedure of the processing of such a program is just as shown in the flowcharts of FIG. 8, 15, 18, 21 or 25.

Exemplary Application #1

Figure 33:
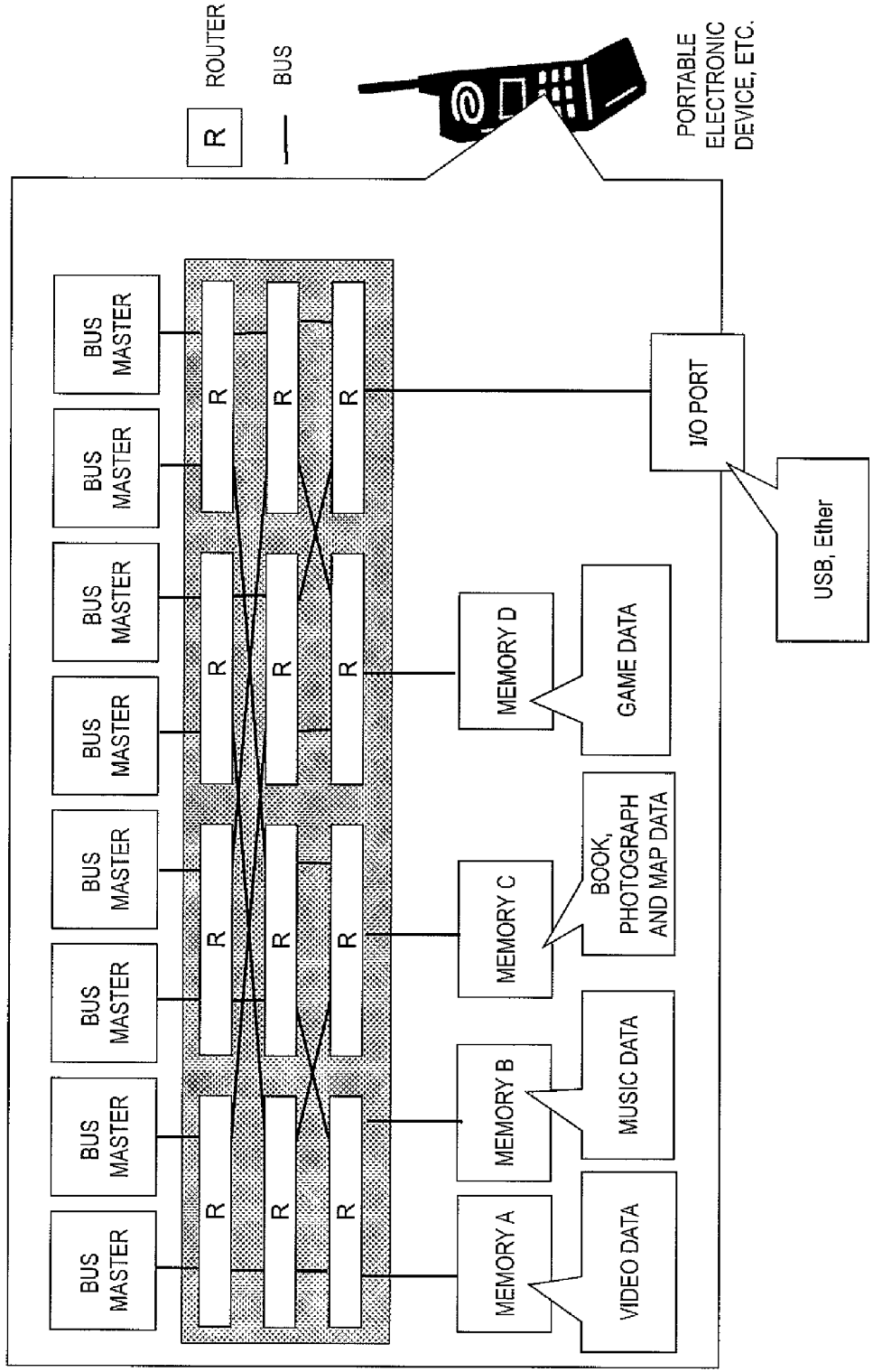
FIG. 33 illustrates an exemplary application of the present disclosure.

Hereinafter, exemplary applications of the router of the present disclosure to actual devices will be described. FIG. 33 illustrates an example in which multiple bus masters and multiple memories on a semiconductor circuit and common input/output (I/O) ports to exchange data with external devices are connected together with distributed buses. Such a semiconductor circuit may be used in portable electronic devices such as cellphones, PDAs (personal digital assistants) and electronic book readers, TVs, video recorders, camcorders and surveillance cameras, for example. The bus masters may be CPUs, DSPs, transmission processing sections and image processing sections, for example. The memories may be volatile DRAMs and/or nonvolatile flash memories. Also, the input/output ports may be USB, Ethernet™ or any other communications interfaces to be connected to an external storage device such as an HDD, an SSD or a DVD.

When multiple applications or services are used in parallel with each other (e.g., when multiple different video clips or musical tunes are reproduced, recorded or transcoded, or when book, photograph or map data is viewed or edited, or when a game is played), respective bus masters will access memories more frequently. If there was only one memory to be accessed by the respective bus masters, then those accesses would be overconcentrated at one point. To reduce such an overconcentration of accesses, however, the input and output transmission ranges should be broadened on the memory side, which would increase the cost.

To avoid such an overconcentrated memory accesses, it is effective to connect those bus masters and memories together with distributed buses either by physically classifying the memories to be used by bus masters according to the type of the application or the service or by using external storage devices such as an HDD drive.

However, if a bus master has transmitted a data packet to Memory A at a high rate in order to save video data there, then every buffer on the transmission path will be occupied with the packet to be sent to the memory A frequently. In that case, data will not flow to the other memories smoothly and the performances of the other applications or services will decline and the processing time will increase.

If the router of the present disclosure is used, however, virtual channels of each router can be allocated uniformly to packets to be sent to multiple different destinations. As a result, the router of the present disclosure can prevent packets to be sent to a particular memory from occupying the virtual channels, thus contributing to improving the performances of all applications and services on a semiconductor circuit and shortening the processing time.

Exemplary Application #2

Next, an exemplary application of the router of the present disclosure to a multi-core processor will be described.

Figure 34:
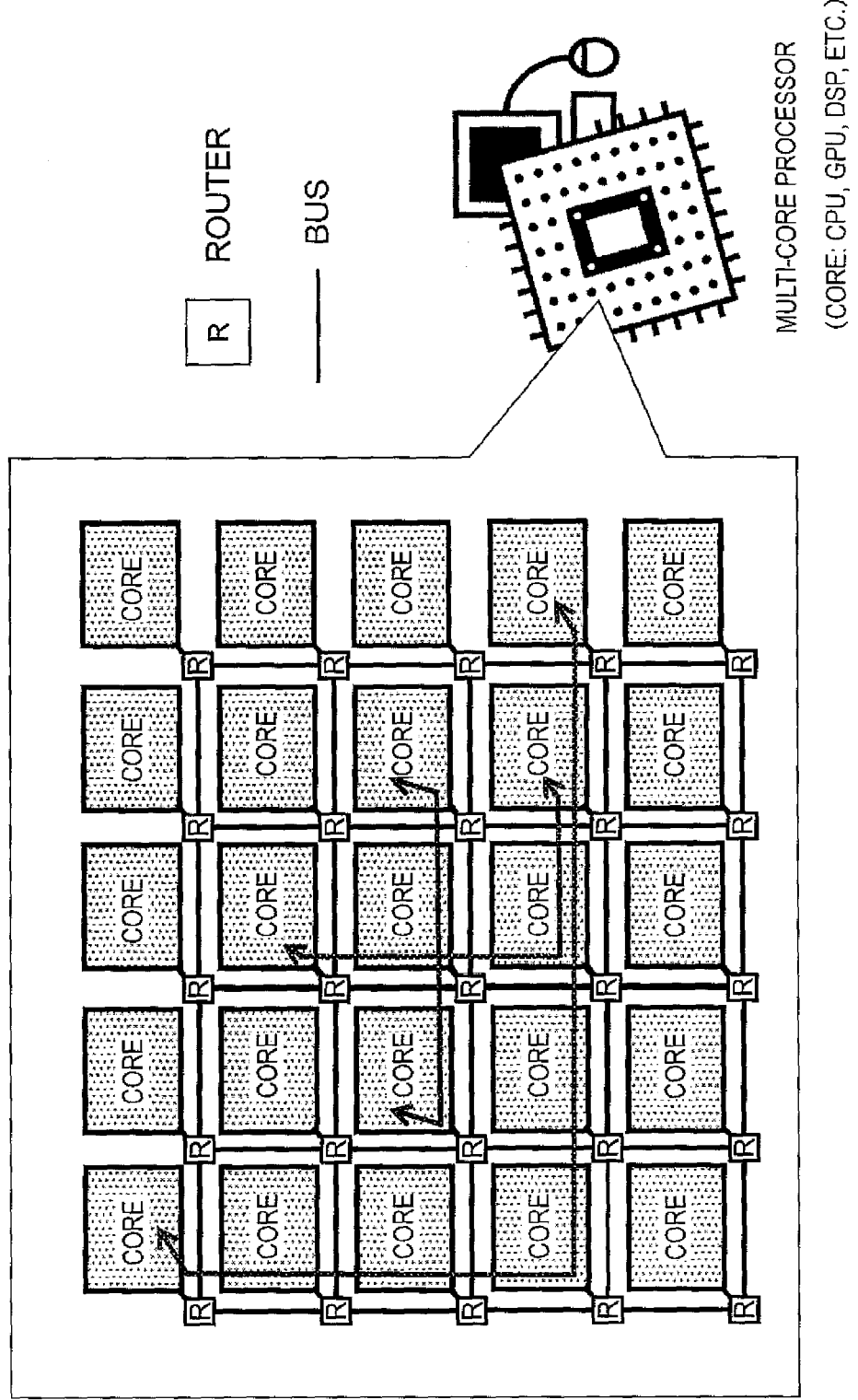
FIG. 34 illustrates another exemplary application of the present disclosure.
Figure 36:
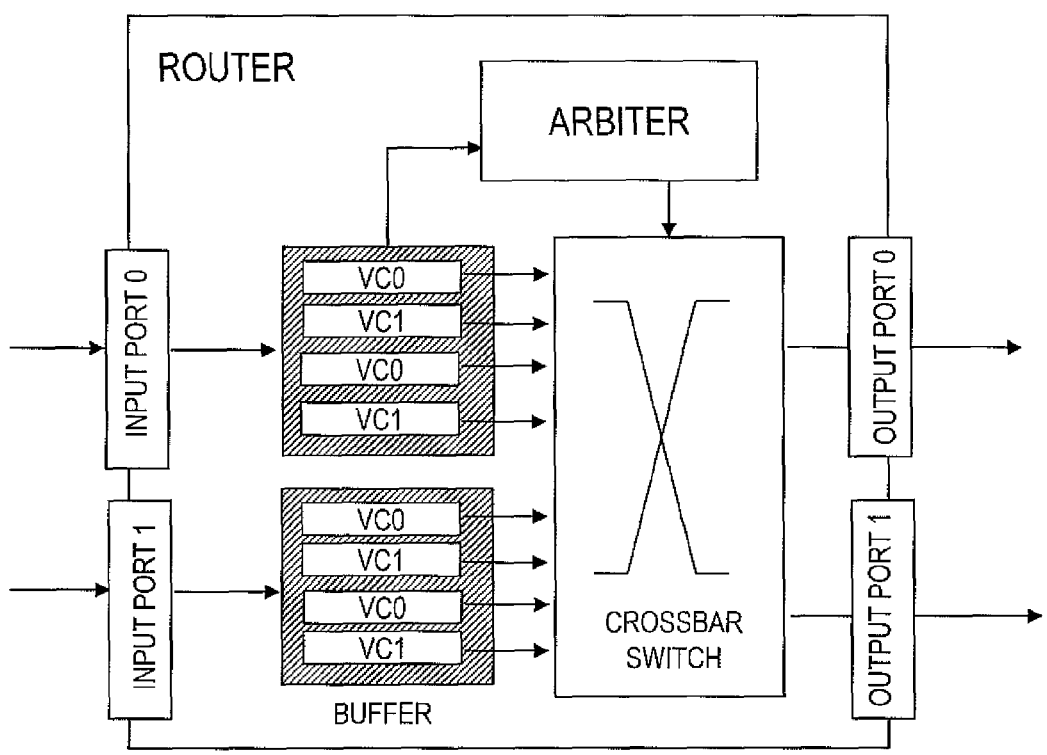
FIG. 36 outlines configurations for known routers.

FIG. 34 illustrates a multi-core processor in which a number of core processors such as a CPU, a GPU and a DSP are arranged in a mesh pattern and connected together with distributed buses in order to improve the processing performance of these core processors. In this configuration, each of these core processors may function as either a first node or a second node according to the present disclosure.

On this multi-core processor, communications are carried out between the respective core processors. For example, each core processor has a cache memory to store necessary data to get arithmetic processing done. And information stored in the respective cache memories can be exchanged and shared with each other between those core processors. As a result, their performance can be improved.

However, the communications are carried out between those core processors on such a multi-core processor at respectively different locations, over mutually different distances (which are represented by the number of routers to hop), and with varying frequencies of communication. That is why if data packets transmitted are just relayed with their order of reception maintained, then some routers will have all of their buffers occupied with packets to be sent to particular core processors and will not let the data flow smoothly. As a result, the performance of the multi-core processor will decline and its processing time will increase.

If the router of the present disclosure is used, however, virtual channels of each router can be allocated uniformly to packets to be sent to multiple different destinations. As a result, the router of the present disclosure can prevent packets to be sent to a particular core processor from occupying the virtual channels, thus contributing to improving the performances of those core processors and shortening the processing time.

Exemplary Application #3

In the embodiments and exemplary applications described above, configurations in which the present disclosure is implemented on a chip have been described. However, the present disclosure can be carried out not just as such on-chip implementation but also as a simulation program for performing design and verification processes before that on-chip implementation process. And such a simulation program is executed by a computer. In this exemplary application, the respective elements shown in FIGS. 2, 5 and 22 are implemented as a class of objects on the simulation program. By loading a predefined simulation scenario, each class gets the operations of the respective elements performed by the computer. In other words, the operations of the respective elements are carried out either in series or in parallel to/with each other as respective processing steps by the computer.

A class that is implemented as router gets such a simulation scenario, which has been defined by a simulator, loaded, thereby setting conditions on destination addresses, source addresses, time information and so on and also determining the timings to send packets that have been received from a class of other routers.

The class that is implemented as routers performs its operation until the condition to end the simulation, which is described in the simulation scenario, is satisfied, thereby calculating and getting the throughput and latency during the operation, a variation in flow rate on the bus, and estimated operating frequency and power dissipation and providing them to the user of the program. And based on these data provided, the user of the program evaluates the topology and performance and performs design and verification processes.

For example, various kinds of information such as the ID of a node on the transmitting end, the ID of a node on the receiving end, the size of a packet to send, and the timing to send the packet are usually described on each row of the simulation scenario. Optionally, by evaluating a plurality of simulation scenarios in a batch, it can be determined efficiently whether or not the intended performance is ensured by every possible scenario imagined. Furthermore, by comparing the performance with the topology or the number of nodes of the bus and/or the arrangement of the transmitting nodes, the routers and the receiving nodes changed, it can be determined what network architecture is best suited to the simulation scenario. In that case, the configuration of any of the embodiments described above can be used as design and verification tools for this embodiment. That is to say, the present disclosure can also be carried out as such design and verification tools.

When a DSP for processing multiple media and a CPU for transferring files at high rates are integrated together on a single SoC (system on chip) with distributed buses, the present disclosure contributes effectively to getting the circuit design process done with a lot of resources saved and with the processing time delay reduced. In addition, by saving a lot of resources and by reducing the processing time delay, the present disclosure can also cut down the power dissipation of the overall integrated circuit.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A router for use in a data transfer system that includes a first node from which data is transmitted, a second node at which the data that has been transmitted from the first node is received, and a plurality of routers that relay the data to be transferred between the first and second nodes through a bus, the router comprising:
   a plurality of data storage sections that stores input data including multiple groups of data; and
   an arbiter that compares the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data, wherein
   when the multiple groups of data, which share at least a part of a transmission path represented by the data of each said group, are stored in the plurality of data storage sections,
   the arbiter calculates, on a group basis, a difference or a ratio between the number of the data storage sections used in the arbiter's own router and the number of the data storage sections used in the adjacent router, and determines whether to output the data of each group based on the difference or the ratio.

2. The router of claim 1, wherein the destination of that data is the adjacent router.

3. The router of claim 1, wherein the arbiter is configured to compare the availability of the data storage section of its own router with respect to data that has the same destination address and/or the same source address to the availability of the data storage section in the adjacent router, thereby determining, based on a result of the comparison, whether or not to output that data.

4. The router of claim 1, wherein the arbiter is configured to compare the number of data storage sections that store the data that shares at least a part of the transmission path to the number of data storage sections that store the data that shares at least that part of the transmission path in the adjacent router, thereby determining, based on a result of the comparison, whether or not to output that data.

5. The router of claim 4, wherein if the difference obtained by subtracting the number of data storage sections that store the data that shares at least that part of the transmission path in the adjacent router from the number of data storage sections that store the data that shares at least a part of the transmission path is equal to or greater than a preset threshold value, the arbiter outputs the data, but if the difference is less than the threshold value, the arbiter does not output the data.

6. The router of claim 5, wherein the threshold value is zero.

7. The router of claim 5, wherein when multiple groups of data, which share at least a part of the transmission path represented by the data of each said group, are stored in the plurality of data storage sections, the arbiter obtains a difference by subtracting the number of the data storage sections used in the next adjacent router from the number of the data storage sections used in its own router, finds what groups have differences that are equal to or greater than the threshold value, and outputs the data of at least one of the groups that has the maximum difference.

8. The router of claim 7, wherein if there are multiple data that have the maximum difference, the arbiter outputs the data of the smallest number of the data storage sections that are used in the next adjacent router.

9. The router of claim 8, wherein the data entered into the plurality of data storage sections include time information indicating one of a time when the data was transmitted, the amount of time that has passed since the data was transmitted, a time when the data is expected to arrive at the second node, and the time left until the time when the data is expected to arrive at the second node, and the arbiter determines the data to output based on the value of the time information.

10. The router of claim 9, wherein if multiple data indicate that the smallest number of data storage sections will be used in the next adjacent router, the arbiter determines the data to output based on the value of the time information.

11. The router of claim 1, wherein each of the plurality of data storage sections is a virtual channel that is comprised of virtual lines.

12. The router of claim 1, wherein the arbiter further includes a channel availability information communications section which sends information indicating the number of data storage sections that store the data that shares at least a part of the transmission path to at least one of the adjacent router and another adjacent router and which gets the information indicating the number of data storage sections that store the data that shares at least that part of the transmission path from the former adjacent router.

13. The router of claim 1, wherein the router is arranged adjacent to the first node, and
   wherein the arbiter further includes a flow controlling and regulating section which instructs the first node to control the rate of data to transfer if the number of data storage sections that store the data that shares at least a part of the transmission path is larger than a predetermined threshold value.

14. A method for controlling a router for use in a data transfer system that includes a first node from which data is transmitted, a second node at which the data that has been transmitted from the first node is received, and a plurality of routers that relay the data to be transferred between the first and second nodes through a bus, the method comprising the steps of:
   storing input data in a plurality of data storage sections including multiple groups of data;
   comparing the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data; and when the multiple groups of data, which share at least a part of a transmission path represented by the data of each said group are stored in the plurality of data storage sections, calculating, on a group basis, a difference or a ratio between the number of the data storage sections used in the router and the number of the data storage sections used in the adjacent router, and determining whether to output the data of each group based on the difference or the ratio.

15. A non-transitory computer-readable medium stored thereon a control program, and to be executed by a computer mounted in a router for use in a data transfer system that includes a first node from which data is transmitted, a second node at which the data that has been transmitted from the first node is received, and a plurality of routers that relay the data to be transferred between the first and second nodes through a bus, wherein the program causes the computer in the router to execute the steps of:

storing input data in a plurality of data storage sections including multiple groups of data;

comparing the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data; and when the multiple groups of data, which share at least a part of a transmission path represented by the data of each said group are stored in the plurality of data storage sections, calculating, on a group basis, a difference or a ratio between the number of the data storage sections used in the router and the number of the data storage sections used in the adjacent router, and determining whether to output the data of each group based on the difference or the ratio.

16. A non-transitory computer-readable medium stored thereon a simulation program, and to be executed by a computer, the program being dedicated to design a router for use in a data transfer system that includes a first node from which data is transmitted, a second node at which the data that has been transmitted from the first node is received, and a plurality of routers that relay the data to be transferred between the first and second nodes through a bus, wherein the program causes the computer to execute the steps of:

storing input data in a plurality of data storage sections including multiple groups of data;

comparing the availability of at least one of the plurality of data storage sections with respect to data that is stored in that data storage section and that shares at least a part of a transmission path to the availability of another data storage section in an adjacent router with respect to that data that also shares at least that part of the transmission path, thereby determining, based on a result of the comparison, whether or not to output that data; and when the multiple groups of data, which share at least a part of a transmission path represented by the data of each said group are stored in the plurality of data storage sections, calculating, on a group basis, a difference or a ratio between the number of the data storage sections used in the router and the number of the data storage sections used in the adjacent router, and determining whether to output the data of each group based on the difference or the ratio.

* * * * *